United States Patent [19]

Takahashi et al.

[11] Patent Number: 4,617,577

[45] Date of Patent: Oct. 14, 1986

[54] THERMAL-IMAGE-TRANSFER RECORDING APPARATUS

[75] Inventors: Keiji Takahashi, Kanagawa; Sakae Fujimoto, Tokyo, both of Japan

[73] Assignee: Ricoh Company, Ltd., Japan

[21] Appl. No.: 532,734

[22] Filed: Sep. 15, 1983

[30] Foreign Application Priority Data

| | | | |
|---|---|---|---|
| Sep. 16, 1982 | [JP] | Japan | 57-140421[U] |
| Sep. 17, 1982 | [JP] | Japan | 57-161909 |
| Sep. 27, 1982 | [JP] | Japan | 57-145916[U] |

[51] Int. Cl.[4] .......... G01D 15/10

[52] U.S. Cl. .......... 346/76 PH; 346/105; 346/139 R; 400/120; 400/356

[58] Field of Search .......... 400/120, 593, 224.2, 400/234, 235, 235.1, 224, 356; 346/76 R, 76 PH, 139 R, 136, 105; 219/216 PH; 358/304; 101/DIG. 19; 242/193

[56] References Cited

U.S. PATENT DOCUMENTS

| | | | |
|---|---|---|---|
| 3,635,417 | 1/1972 | Kajiwara et al. | 242/78.8 |
| 4,165,191 | 8/1979 | Dickson et al. | 400/124 |
| 4,387,380 | 6/1983 | Asakura et al. | 346/76 PH |
| 4,507,666 | 3/1985 | Kondo et al. | 346/76 PH |

FOREIGN PATENT DOCUMENTS

| | | | |
|---|---|---|---|
| 0003883 | 1/1983 | Japan | 400/120 |

*Primary Examiner*—A. Evans

*Attorney, Agent, or Firm*—Guy W. Shoup

[57] ABSTRACT

A thermal-image-transfer recording apparatus which heats a thermally fusible ink sheet in a selected pattern and transfers the image formed to a superimposed recording sheet, has separate units for holding the ink sheet and the recording sheet. The units engage for recording and disengage when not recording. The recording and ink sheets travel along separate passages in their respective units. A platen roller is disposed in one of the units, and the recording head in the other unit.

Problems due to deformation by heat and humidity are overcome by the disclosed arrangement.

15 Claims, 22 Drawing Figures

FIG. 3(III)
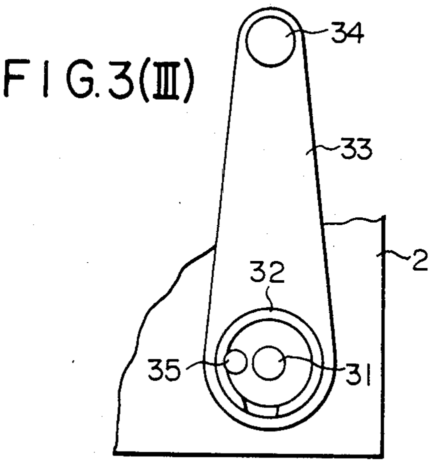

FIG. 14 (II)

F I G. 15(III)
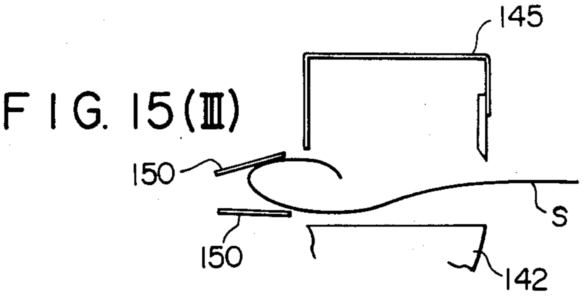

THERMAL-IMAGE-TRANSFER RECORDING APPARATUS

BACKGROUND OF THE INVENTION

The present invention relates to a recording apparatus for transferring a thermally fused ink image from an ink sheet to a recording sheet.

One known type of thermal-image-transfer recording apparatus utilizes an ink sheet composed of a base with a thermally fusible ink layer placed thereon and a recording sheet superimposed on the ink sheet. The ink and recording sheets are fed along against a recording head which, in response to information-dependent signals, heats and fuses ink on the ink sheet in a selected pattern to transfer a fused ink image onto the recording sheet.

The base of the ink sheet is composed of capacitor paper or various kinds of resin film, and the recording sheet comprises plain paper or various types of resin film. The recording head may be in the form of a thermal head or an electrically conductive head. Where the thermal head is employed, the ink layer of the ink sheet is heated and fused by heating elements in the thermal head which is located behind the ink sheet to apply thermal energy to the ink layer through the base or behind the recording sheet to apply thermal energy to the ink layer through the recording sheet. An electrically conductive head is used in combination with an electrically conductive platen roller. With the ink and recording sheets interposed between the head and platen roller, an electric current is passed through the ink and recording sheets to fuse a desired pattern on the ink layer due to Joule heat developed therein.

For feeding superimposed recording and ink sheets across the recording head, it has been a conventional practice to provide a single roll of such superimposed sheets and unreel them from the single roll (Japanese Laid-Open Patent Publication No. 57-26239). It is therefore necessary before the sheets are placed in the recording apparatus to first produce the ink sheet, and then put it on the recording sheet and wind them together into a roll.

Setting the superimposed sheets in the recording apparatus is disadvantageous in that when the sheets are passed between the platen roller and the recording head, the sheets, particularly the ink sheet which is thin, are liable to wrinkles. Wrinkles are a source of printing errors.

During recording operation, information-indicative signals are applied to the thermal head to selectively heat the heating elements which apply heat to the ink sheet. At this time, the portion of the base of the ink sheet which is in contact with the heating elements and heated thereby is deformed by the applied heat. The deformation of the base affects the undeformed ink sheet portions by producing wrinkles therein. These wrinkles present no problem as long as they are confined close to the recorded portion of the ink sheet However, any wrinkles created further away, on the unused portion of the ink sheet, will cause defective recorded images.

Where a roll of recording and ink sheets is used, a recorded portion of the sheets is cut off by a cutter, and then the leading end of the sheets is wound back from the cutter toward a recording zone. While the recording sheets are being wound back, the unused portion of the ink sheet is likely to slacken, resulting in faulty recorded images later on. At the same time, the used portion of the ink sheet is subject to excessive tension tending to rupture the ink sheet or generate undesirable recorded image defects later on.

The recording sheet is also prone to wrinkles if it is skewed while being transferred along, and these wrinkles are also a source of recording errors.

The recording and ink sheets are susceptible to humidity; they swell wh they absorb moisture in a highly humid environment. Portions of the recording and ink sheets which are sandwiched between the platen roller and the recording head are free from the influence of humidity. When the recording apparatus is not in use for a long period of time under highly humid conditions the sandwiched sheet portion is kept from swelling, but the adjacent exposed sheet portion is deformed due to swelling. Accordingly, the sheets suffer from irregular surface deformations causing ripple-like wrinkles along the boundary between the sandwiched portion and the exposed portion. Such ripple-like wrinkles are also conducive to undesirable recording errors.

Another problem is that when the sheets remain gripped between the platen roller and the recording head for prolonged periods of time under humid conditions while the recording apparatus is not in operation, the sheets become curled along the platen roller or attach to the platen roller, and hence will not feed smoothly along during recording operation.

After an image has been recorded, the recording and ink sheets are separated from each other. When a large quantity of ink has been transferred from the ink sheet to the recording sheet, the transferred mass of ink serves as an adhesive which prevents separation of the sheets, resulting in a paper jam in the recording apparatus.

The recording sheet on which an image is recorded is cut off by a rotary cutter. At this time, any curled or bent edge of the recording sheet is apt to form a folded edge or cause a paper jam.

SUMMARY OF THE INVENTION

It is an object of the present invention to provide a thermal-image-transfer recording apparatus which allows recording and ink sheets to be superimposed easily without being wrinkled.

Another object of the present invention is to provide a thermal-image-transfer recording apparatus capable of effectively preventing any recording failures which would otherwise be caused by deformation due to heating of the ink sheet during recording operation.

Still another object of the present invention is to provide a thermal-image-transfer recording apparatus which prevents an unused portion of an ink sheet from becoming slackened during the winding back of the recording sheet from a cutter to a recording zone after a recorded portion of the sheet has been cut off.

Still another object of the present invention is to provide a thermal-image-transfer recording apparatus in which an ink sheet is protected from rupture when a recording sheet is being wound back, preventing any recording error due to ink sheet rupture.

Still another object of the present invention is to provide a thermal-image-transfer recording apparatus in which a recording sheet as it is fed along is prevented from suffering wrinkles due for example to skewing thereof.

A still further object of the present invention is to provide a thermal-image-transfer recording apparatus which effectively prevents undesirable defective recorded images which would otherwise result from exposure of recording and ink sheets to high humidity.

A still further object of the present invention is to provide a thermal-image-transfer recording apparatus which is capable of separating recording and ink sheets from each other without failure after a recording operation.

A yet further object of the present invention is to provide a thermal-image-transfer recording apparatus which effectively prevents folded edges or paper jams due to tendency of the recording sheets to become bent.

A still further object of the present invention is to provide a thermal-image-transfer recording apparatus capable of allowing recording and ink sheets to be superimposed easily therein, of preventing recording errors due to deformation by heat slackening of the ink sheet, or wrinkling of the recording sheet by a skew thereof, or moisture absorption, of avoiding ink sheet rupture and defective recorded images during winding back of the recording sheet, of reliably separating the recording and ink sheets from each other, and of preventing folds in the cut edges of the recording sheet.

Separate rolls of recording and ink sheets are set in respective units respectively, the units have separate passages, for travel of the sheets. A recording head is disposed in one of the units, and a platen roller is disposed in the other unit. The two units are releasably engageable with each other. The sheets can be set respectively in the units when they are disengaged from each other. A recording process is effected when the units are in mutual engagement, and the sheets are fed along through a recording zone in response to rotation of the platen roller.

Since the passages of travel of the sheets are provided respectively in the separate units and the sheets are set therein when the units are disengaged and separated from each other, the sheets can easily be set in the respective units without being subjected to wrinkles.

Any recording errors or faults due to deformations by heat of the ink sheet during a recording operation can be prevented by a tensioning roller located, upstream of the recording zone which cooperates with the platen roller in keeping the ink sheet taut. The tensioning roller is positioned as closely to the platen roller as possible, or held in contact with the platen roller, to sufficiently tension and reduce the length of the ink sheet between these rollers. This effectively prevents any wrinkles created due to thermal deformations of the ink sheet from spreading over to unused portions of the ink sheet.

To prevent the unused ink sheet portion from slackening at the time of winding back the recording sheet, a tensioning roller rotatable in response to the feeding of the ink sheet is provided and a resilient energy storing means for urging the tensioning roller to turn in a reverse direction is used. The resilient energy storing means stores resilient energy while the tensioning roller is rotated in a normal direction. When the recording sheet is wound back, the stored resilient energy is released to cause the tensioning roller to turn in the reverse direction. Such reverse rotation of the tensioning roller is effective in taking up any slackening of the ink sheet. Thus, the unused ink sheet portion is effectively prevented from slackening.

Possible ink sheet rupture at the time the recording sheet is wound back can be prevented by a takeup roller for winding a used portion of the ink sheet and a tensioning roller for tensioning the ink sheet between itself and the recording zone. The tensioning roller and the takeup roller are driven by the same drive source rotatable in one direction only through frictional couplings. When the tensioning and takeup rollers are subjected to a certain load by the ink sheet upon winding back of the recording sheet, there is developed slippage between the drive source and these rollers, thus protecting the used portion of the ink sheet against excessive tension. Therefore, the ink sheet can be prevented from being torn.

To feed the recording sheet properly and prevent it from wrinkling due to skewing thereof while being fed along, the recording sheet as it moves toward the recording zone is kept taut between the platen roller and a tensioning roller. Rotation of the platen roller is transmitted to the tensioning roller through a means for rotating these rollers at different peripheral speeds and a frictional power transmission mechanism. When there is no recording sheet, the tensioning roller is rotated at a peripheral speed lower than that of the platen roller. When there is a recording sheet, the tensioning roller is rotated at the same peripheral speed as that of the platen roller while being allowed to slip by the frictional power transmission mechanism. At this time, a frictional force imposed by the frictional power transmission mechanism acts as a tensioning force on the recording sheet to feed the latter properly.

Recording errors due to humidity can be eliminated by releasing the platen roller and the recording head from each other while no recording is carried out, especially for an increased period of time. This removes irregular swelling of the recording and ink sheets due to high humidity, which would otherwise be caused by engaggement with the platen roller and the recording head over a prolonged period of time. When the platen roller and the recording head are disengaged from each other, the tensioning roller for winding up the ink sheet is inactivated.

A separation roller and a separator are employed for reliably separating the recording and ink sheets from each other after a recording operation has been effected. One of the sheets is trained around the separation roller which serves to abruptly changes the direction of travel of the sheet, thereby permitting the other sheet to be separated easily due to its stiffness. The separator is caused by gravity to be held against said one of the sheets on the separation roller for reliable separation of the sheets. Any paper jams due to sheet separation failures can effectively be prevented.

A rotary cutter has a movable guide plate disposed in a casing thereof for preventing folded edges or paper jams due to the tendency of the recording paper to get curled. Notwithstanding the tendency of the recording paper to get curled, the leading edge of the recording sheet is properly guided by the movable guide plate while the recording sheet goes through the rotary cutter without suffering from any folded edge.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 14(I) and 14(II) are cross-sectional views showing operation of a rotary cutter.

DESCRIPTION OF THE PREFERRED EMBODIMENT

Figure 1:
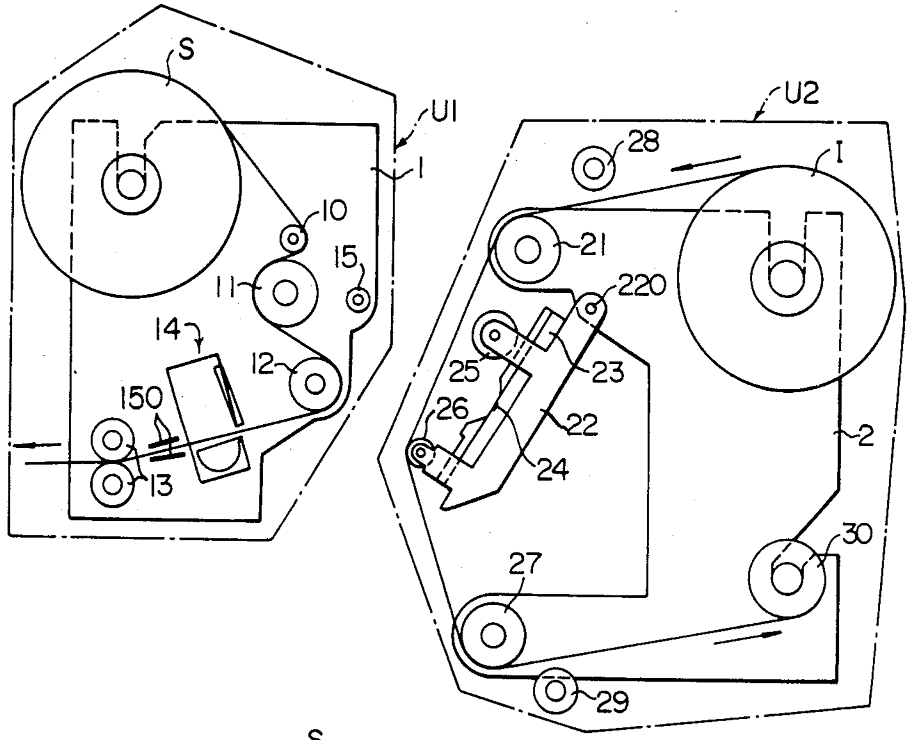
FIG. 1 is a schematic side elevational view of a thermal-image-transfer recording apparatus according to the present invention, the view showing a platen roller and a thermal recording head as separated from each other.

FIG. 1 schematically illustrates a thermal-image-transfer recording apparatus according to the present invention, in which a thermal head is employed as a recording head.

The recording apparatus is primarily composed of first and second units U1, U2. The first unit U1 serves to define a passage along which a recording sheet S is to be fed. The second unit U2 has therein a passage along which an ink sheet I is to be fed. These units U1, U2 are shown separated from each other by dot-and-dash lines, which however should not be interpreted as indicating profiles of the units.

As shown, the passage for the recording sheet S and the passage for the ink sheet I are independent of each other. The first unit U1 is fixedly located in the recording apparatus, while the second unit U2 is movable toward and away from the first unit U1.

The first unit U1 has a pair of side plates 1 (only one shown). A roll of recording sheet S is removably retained between the side plates 1. Between the side plates 1, there are disposed a winding roller 10, a tensioning roller 11, a platen roller 12, a pair of discharge rollers 13, a cutter 14, a winding roller 15, and a guide 150. The recording sheet S is unreeled from the roll and goes around these rollers between the side plates 1.

The winding rollers 10, 15 comprise metal rollers. The platen roller 12 is composed of a metal core coated with a layer of chloroprene rubber. The coated layer may however be of silicone rubber. Each of the discharge rolleres 13 is also comprised of a metal core coated with a layer of chloroprene rubber. The tensioning roller 11 comprises a metal core coated with foam rubber.

The recording sheet S as reeled out of the roll travels through the passage in the first unit U1 in which the recording sheet S is trained around a righthand (as shown in FIG. 1) peripheral surface of the winding roller 10, around a lefthand peripheral surface of the tensioning roller 11, and then around a righthand peripheral surface of the platen roller 12, goes through the cutter 14, and is discharged through the guide 150 by the discharge rollers 13 out of the first unit U1. The winding roller 10 is positioned such that the recording sheet S is held in contact with the tensioning roller 11 through a large angular interval to provide a sufficient frictional force between the recording sheet S and the tensioning roller 11.

The second unit U2 includes a pair of side plates 2 (only shown). A roll of ink sheet I is removably supported between the side plates 2, and a takeup roller 30 for winding up the ink sheet from which thermally fused ink images have been transferred is also removably supported between the side plates 2.

A pair of tensioning rollers 21, 27 extends between and is supported by the side plates 2, with pinch rollers 28, 29 located adjacent to the tensioning rollers 21, 27, respectively. A support arm 22 is pivotably attached by a pin 220 to the side plates 2, there being a slight clearance or play between the pin 220 and the side plates 2. The passage for the ink sheet I in the second unit U2 extends from the roll of the ink sheet I around the tensioning roller 21, the separation roller 26, and the tensioning roller 27 to the takeup roller 30.

The support arm 22 supports thereon a thermal head 23, and a tensioning roller 25 and a separation roller 26. The tensioning rollers 21, 25, 27 each comprise a metal core coated with a layer of foam rubber, and each of the pinch rollers 28, 29 is composed of a metal core coated with a layer of chloroprene rubber. The separation roller 26 is in the form of a roller of metal.

The thermal head 23 is in the form of a narrow plate extending normally to the sheet of FIG. 1, and has on its surface an array of minute heating elements 24 arranged longitudinally of the thermal head 23. As described above, the second unit U2 is movable toward and away from the first unit U1 to enable the thermal head 23 to be displaced toward and away from the platen roller 12.

FIG. 1 shows the position in which the platen roller 12 and the thermal head 23 are separated from each other. The thermal head 23 is separated from the platen roller 12 for permitting the recording sheet S and the ink sheet I to be easily set in the recording apparatus. More specifically, since the passages for the recording sheet S and the ink sheet I are independent of each other, the sheets S, I can quite easily be set in the respective passages simply by moving the thermal head 23 away from the platen roller 12 as illustrated in FIG. 1.

Figure 2:
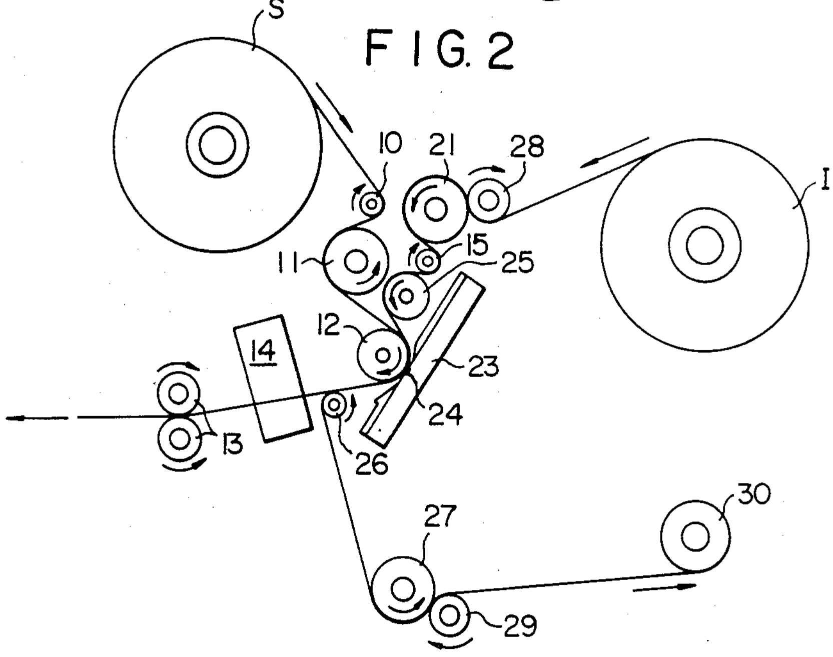
FIG. 2 is a schematic side elevational view of the thermal-image-transfer recording apparatus of FIG. 1, illustrating the position of the parts in recording operation.

The pinch rollers 28, 29 will coact with the tensioning rollers 21, 27, respectively, as shown in FIG. 2. When the thermal head 23 is separated from the platen roller 12, however, the pinch rollers 28, 29 are retracted out of the passage for the ink sheet I as shown in FIG. 1 so that the pinch rollers 28, 29 will not interfere with the setting of the ink sheet I in the passage in the second unit U2.

The independent sheet passages and the separable thermal head 23 and platen roller 12 permit the recording and ink sheets S, I to be easily and neatly set in the units U1, U2, respectively, without letting the sheets suffer from wrinkles which would otherwise result in recording errors.

The minimum distance that the thermal head should be spaced from the platen head cannot uniquely be determined since it depends on the width of the recording and ink sheets S, I. In an application in which the thermal-image-transfer recording apparatus is employed in automatic ticket dispensers or automatic commuter's ticket dispensers, the width (equal to the dimension normal to the sheet of FIG. 1) of recording and ink sheets is in the range from a few to over ten centimeters, and a few centimeters are sufficient as the distance of separation between the thermal head and the platen roller.

Where the thermal-image-transfer recording apparatus is used as a printer in a fascimile receiver, a word processor, or a computer output unit, the sheet width required is tens centimeters, and the thermal head is required to be spaced from the platen roller by a distance of about ten centimeters.

FIG. 2 shows the position of the parts in which the thermal-image-transfer recording apparatus effects recording operation. As shown, the second unit U2 is moved toward the first unit U1.

The platen roller 12 in the first unit U1 is positioned between the tensioning roller 25 and the separation roller 26 in the second unit U2, and coacts with the thermal head 23 in sandwiching the sheets S, I therebetween in an area which will hereinafter be referred to as a "recording zone".

The winding roller 15 in the first unit U1 is located between the tensioning rollers 21, 25 in the second unit U2 to cause the ink sheet I to be looped sufficiently around the tensioning rollers 21, 25. The pinch rollers 28, 29 cooperate with the tensioning rollers 21, 27 in gripping the ink sheet I.

A thermal-image-transfer recording process will briefly be described with reference to FIG. 2.

The sheets S, I from their rolls are set in the illustrated passages, respectively. The sheets S, I are superimposed in the recording zone and sandwiched between the thermal head 23 and the platen roller 12. The sheets S, I are fed along through the recording zone by the platen roller 12 rotating clockwise about its own axis. As the platen roller 12 rotates, the sheets S, I are held together due to frictional forces while they move past the thermal head 23.

At this time, an information-dependent signal representative of an image to be recorded is applied as an electrical signals to the thermal head 23, whereupon selected heating elements 24 are heated by the applied signal. One-dot signal applied to each heating element 24 has a pulse duration of about 2 m sec. Each selected heating element 24 is instantaneously heated up to about 300° to 400° C. by the pulse signal, and then instantaneously cooled down to normal temperature upon removal of the pulse signal.

When the selected heating element or elements 24 are heated, the ink sheet I is heated through its base in a pattern corresponding to the heated element or elements 24, and the ink layer of the ink sheet I which is held in contact with the recording sheet S is fused in the pattern of a small dot or dots corresponding to the heated element or elements 24. The ink layer is fused at a temperature in the range from 60° to 80° C. The fused mass of ink is now transferred to the recordin,g sheet S.

The sheets S, I having left the platen roller 12 are separated from each other at the separation roller 26. The recording sheet S is discharged through the cutter 14 by the discharge rollers 13. After the recording operation has been finished, the portion of the recording sheet S which bears the recorded image is cut off at its trailing edge by the cutter 14, and the cut piece is discharged out of the recording apparatus. The ink sheet I is wound around the takeup roller 30.

The foregoing is a brief summary of the thermal-image-transfer recording process.

The rollers employed in the recording apparatus of the invention will now be described.

The platen roller 12 is driven by a reversible stepper motor. The discharge rollers 13 are also driven by the same reversible stepper motor in unison with the platen roller 12. The tensioning roller 11 is driven in coaction with the platen roller 12 as described later on. The winding rollers 10, 15 in the first unit U1 are not positively driven, but are idly rotatable in response to movement of the sheets S, I, respectively.

The tensioning roller 27 and the takeup roller 30 in the second unit U2 are driven by a motor which rotates in one direction only, as described later on. The tension roller 25 and the separation roller 26 are not positively driven, but are idly rotatable in response to travel of the ink sheet I. The tensioning roller 21 is not positively driven and is rotatable, but presents resistance to its own counterclockwise rotation, as described later on. The pinch rollers 28, 29 are freely rotatable, but not positively driven.

The tensioning roller 25 will be described for its function in greater detail. During recording operation as shown in FIG. 2, the ink sheet I is guided by the platen roller 12 and the winding roller 15 to be wound around the tensioning roller 25 through a large angular interval. The ink sheet I is tensioned strongly between the tensioning roller 25 and the platen roller 12 under a frictional force between the tensioning roller 25 and the ink sheet I.

When the heating elements 24 on the thermal head 23 are selectively heated by the applied signals to thereby heat the ink sheet I, the portion of the base of the ink sheet I which is heated in contact with the heating elements 24 is deformed due to the heat developed therein. The deformation of the ink sheet base affects adjacent undeformed portions of the ink sheet base by forming wrinkles therein. Such thermally induced wrinkles pose no problem in the portion of the ink sheet which has moved past the recording zone, but are a source of recording errors in an unused portion of the ink sheet. With illustrated arrangement, the tensioning roller 25 is positioned as closely as possible to the platen roller 12 during the recording operation to thereby shorten the straight and flat portion of the ink sheet I between these rollers 25, 12 as much as possible and apply a sufficient tensioning force to that portion of the ink sheet I with the tensioning roller 25. The reduced length of the straight ink sheet portion between the rollers 25, 12 and the increased tensioning force imposed thereon are effective in keeping that straight ink sheet portion taut to avoid any unwanted wrinkles therein. The shorter the straight ink sheet portion, the better in the interest of wrinkle-free flatness. Therefore, the tensioning roller 25 may be pressed against the platen roller 12 with the sheets S, I interposed therebetween during recording operation.

The tensioning roller 25 is also effective in protecting the ink sheet I against wrinkling due to skewing thereof.

A mechanism for displacing the second unit U2 toward the first unit U1 will be described. The second unit U2 is movable toward and away from the first unit U1 on a rail guide mechanism (not shown in FIG. 1), in a manner as shown in FIGS. 3(I) through 3(III).

Figure 3I:
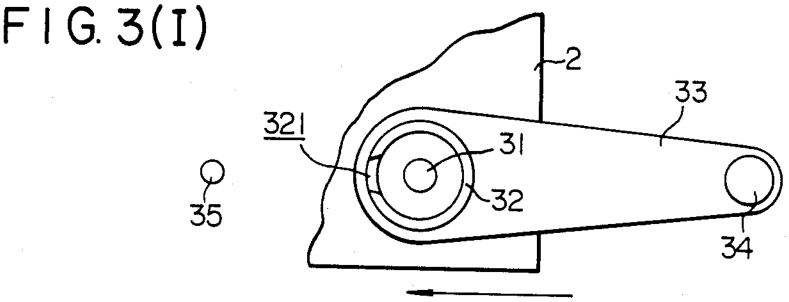
FIGS. 3(I) through 3(III) are fragmentary side elevational views showing the manner in which a second unit is separated from and coupled to a first unit.
Figure 3:
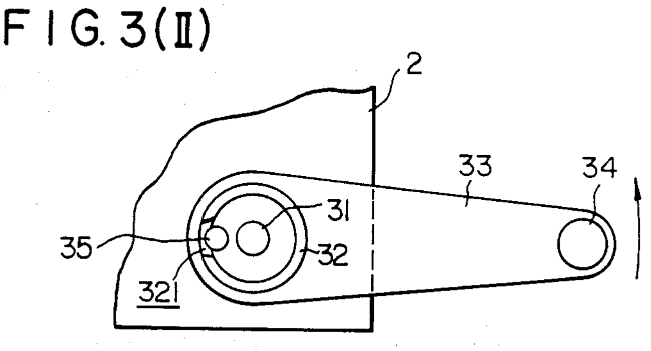

More specifically, as illustrated in FIGS. 3(I) through 3(III), a shaft 31 is rotatably mounted on one of the side plates 2 of the second unit U2, and a locking member 32 and a lever 33 are fixed to the shaft 31. The lever 33 has a grip 34 on its free end remote from the shaft 31. By gripping the grip 34 and applying lateral forces thereto, the second unit U2 is smoothly moved toward or away from the first unit U1 on the rail guide mechanism, as shown in FIG. 3(I).

The locking member 32 is in the form of a short hollow cylinder having an axis extending normal to the sheet of FIGS. 3(I) through 3(III). The locking member 32 has a tapered locking recess 321. A locking pin 35 (FIG. 3(II) and 3(III)), which coacts with the locking member 32, is fixedly mounted on an immovable member of the recording apparatus, such as one of the side plates 1 of the first unit U1.

When the grip 34 is pushed to the left from the position of FIG. 3(I), the second unit U2 is moved leftward until the locking pin 35 enters the recess 321 in the locking member 32 as illustrated in FIG. 3(II). The lever 33 is then turned counterclockwise about the shaft 31 toward the position of FIG. 3(III), in which the locking member 32 is fully locked by the locking pin 35. The second unit U2 is now fixed with respect to the first unit U1, and they are coupled as shown in FIG. 2.

The lever 33 is operatively related to displacement of the pinch rollers 28, 29, pressing engagement of the thermal head 23 against the platen roller 12, and positioning of the thermal head 23 with respect to the platen roller 12, as described below.

Displacement of the pinch rollers 28, 29 will first be described. In a recording position, the pinch rollers 28, 29 are displaced against the tensioning rollers 21, 27, respectively, to sandwich the ink sheet I therebetween, as shown in FIG. 2. When the first and second units U1, U2 are separated from each other, the pinch rollers 28, 29 are withdrawn from the passage of travel of the ink sheet I so that they will not interfere with the setting of the ink sheet I in the second unit U2. The pinch rollers 28, 29 are displaced by a mechanism illustrated in FIG. 4.

Figure 4:
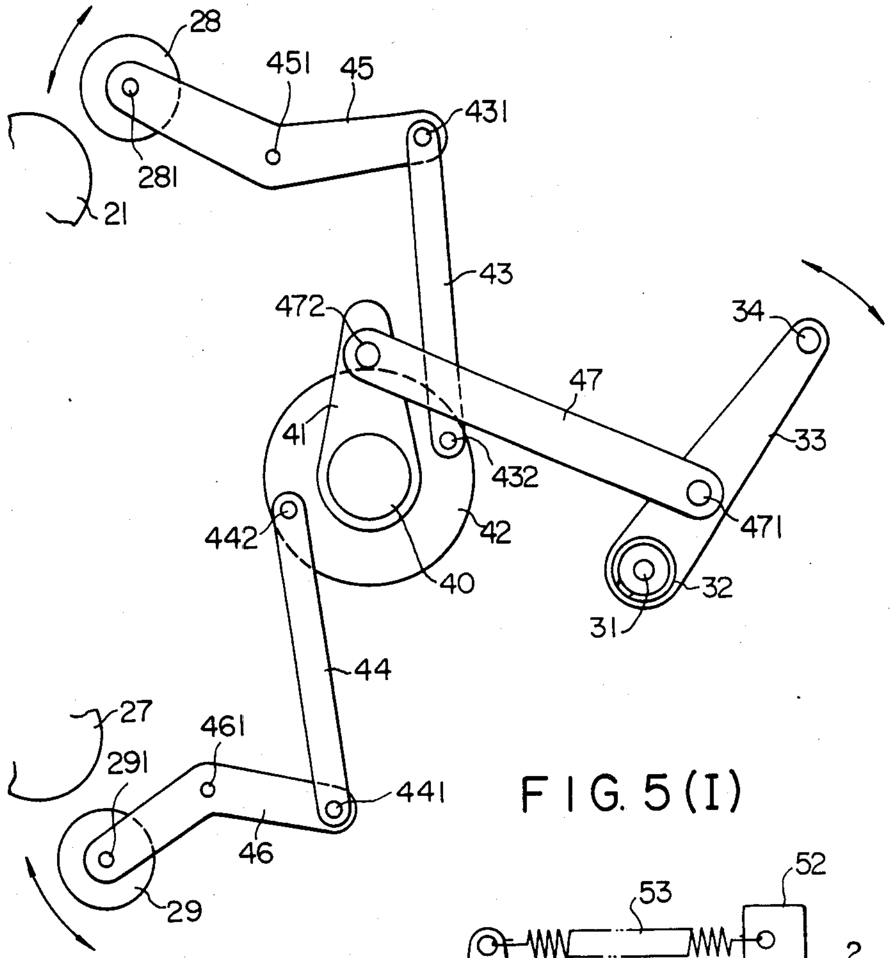
FIG. 4 is a side elevational view of a mechanism for moving pinch rollers.

As shown in FIG. 4, a shaft 40 is rotatably mounted on the side plate 2 (not shown in FIG. 4) on which the shaft 31 is mounted. A lever 41 and a disk 42 are coaxially fixed to the shaft 40. Shafts 451, 452 are mounted on the same side plate 2, and levers 45, 46 are pivotably mounted on the levers 451, 461, respectively.

The levers 41, 33 are interconnected by a connecting link 47 having one end pivoted to the lever 33 by a pin 471 and the other end pivoted to the lever 41 to a pin 472. The lever 45 supports on one free end thereof a shaft 281 of the pinch roller 28, and the lever 46 supports on one free end thereof a shaft 291 of the pinch roller 29.

A connecting link 43 has one end pivoted by a pin 431 to the opposite free end of the lever 45, and the other end pivoted by a pin 432 to the disk 42. Likewise, a connecting link 44 has one end pivoted by a pin 441 to the opposite free end of the lever 46, and the other end pivoted by a pin 442 to the disk 42.

Angular movement of the lever 33 is transmitted through the connecting link 47 to the lever 41, and then through the shaft 40 to the disk 42. Thus, the disk 42 is turned about its own axis in the same direction as that in which the lever 33 is angularly moved. The turning movement of the disk 42 is transmitted through the connecting links 43, 44 to the levers 45, 46, respectively.

When the lever 33 is angularly moved clockwise from the position of FIG. 4, the levers 45, 46 are turned clockwise and counterclockwise, respectively, to cause the pinch rollers 28, 29 to be displaced away from the tensioning rollers 21, 27, respectively. Conversely, when the lever 33 is angularly moved counterclockwise from the position of FIG. 4, the pinch rollers 28, 29 are angularly displaced toward the tensioning rollers 21, 27, respectively. The pinch rollers 28, 29 can thus be angularly moved toward and away from the tensioning rollers 21, 27, respectively.

Positioning of the thermal head 23 with respect to the platen roller 12 will be described. Proper thermal image transfer requires that the platen roller 12 and the thermal head 23 be positioned properly with respect each other. As described above, however, the passages of travel of the recording sheet S and the ink sheet I are independent of each other, and the platen roller 12 in the first unit U1 and the thermal head 23 in the second unit U2 are separable away from each other.

If the thermal head 23 had its reference position fixed in the second unit U2 and the first and second units U1, U2 were positionally displaced relatively to each other, then the thermal head 23 and the platen roller 12 would be displaced in their relative positions during recording operation.

Figure 5I:
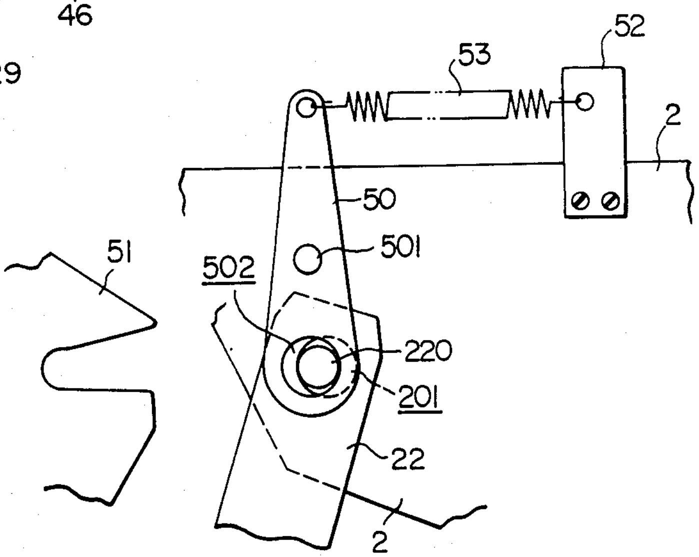
FIGS. 5(I) and 5(II) are fragmentary side elevational views of a mechanism for positioning the thermal head accurately with respect to the platen roller.

According to the recording apparatus of the invention, the thermal head 23 and the platen roller 12 are relatively positioned when the recording apparatus is in a recording mode, as follows:

As shown in FIG. 1, the thermal head 23 is secured to the support arm 22 supported on the side plates 2 by the shaft 220 with a small clearance or play. As illustrated in FIG. 5(I), the shaft 220 to which the support arm 22 is affixed is loosely fitted in a hole 201 defined in the side palte 2 as shown. A lever 50 is swingably mounted by a pin 501 to the side plate 2 and has in one end thereof a hole 502 in which the shaft 220 is loosely fitted.

An engagement plate 52 is fastened to the side plate 2, and a tension spring 53 is coupled between the other end of the lever 50 and the engagement plate 52. One of the side plates 1 of the first unit U1 which corresponds to the side plate 2 illustrated in FIG. 5(I) supports a bearing member 51 fastened thereto and having a recess.

Figure 5:
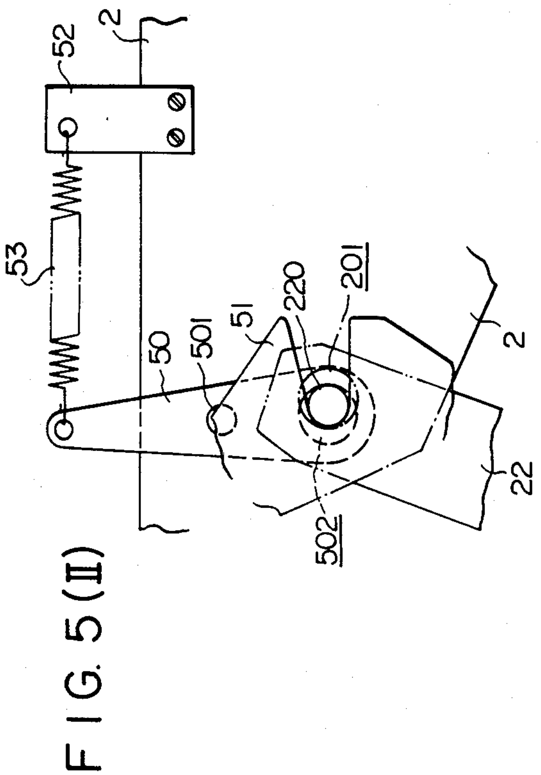

When the second unit U2 is moved to the left from the position of FIG. 1 and fixed to the first unit U1 as shown in FIGS. 3(I) through 3(III), the shaft 220 fits deeply into the recess in the bearing member 51 as shown in FIG. 5(II). When the second unit U2 is locked with respect to the first unit U1, the lever 50 is slightly angularly moved counterclockwise from the position of FIG. 5(I) to the position of FIG. 5(II). Such angular movement of the lever 50 stretches the spring 53, which then urges the lever 50 to turn clockwise about the pin 501. The lever 50 thus biased under the tension of the spring 53 causes the shaft 220 to be firmly pressed against the bottom of the recess in the bearing member 51.

The bearing member 51 is fixed in position with respect to the platen roller 12. Accordingly, when the shaft 220 is secured against the bearing member 51, the platen roller and the thermal head are relatively positioned uniquely to a nicety. The shaft 220 as it is firmly positioned with respect to the bearing member 51 still remains rotatable about its own axis. Then, by turning the support arm 22 about the shaft 220, the thermal head 23 affixed to the support arm 22 can be brought into proper positional relationship to the platen roller 12.

Figure 6:
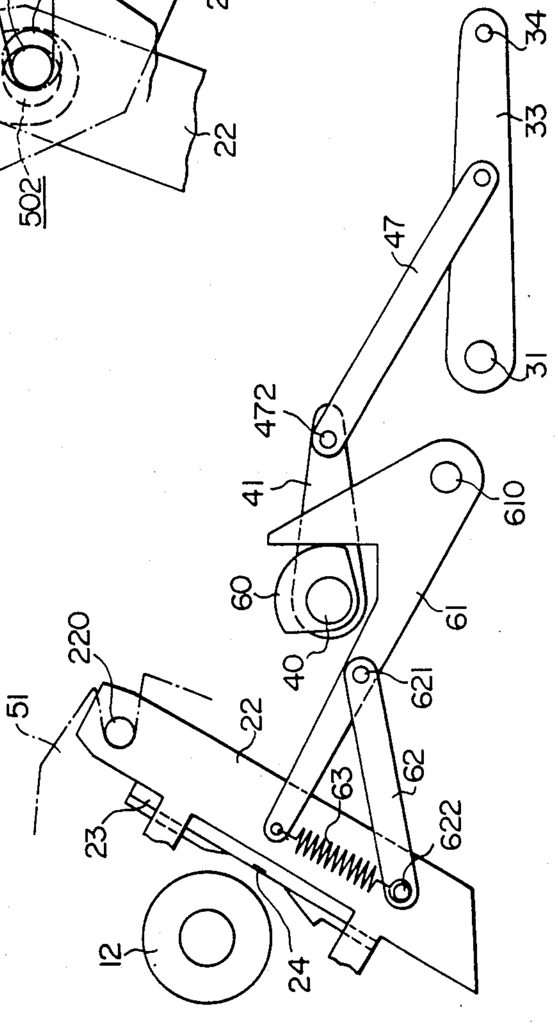
FIG. 6 is a side elevational view of a mechanism for pressing the thermal head against the platen roller.

Such angular movement of the thermal head 23 on the support arm 22 will then be described with respect to FIG. 6. A cam 60 is fixedly mounted on the shaft 40. A bifurcated lever 61 is pivotably mounted on a pin 610 secured to the side plate 2, and has a shorter branch held against the cam 60. The other longer branch of the bifurcated lever 61 has a pin 621 fixed thereto at a central position, and a connecting link 62 has one end pivotably coupled to the pin 621. The connecting link 62 has an opposite end pivotably coupled by a pin 622 secured to a lower end portion of the support arm 22.

A tension spring 63 is connected between the pin 622 and the longer branch of the bifurcated lever 61 for normally urging the latter to turn counterclockwise about the pin 610 for thereby keeping the shorter branch in abutment against the cam 60.

FIG. 6 shows the position in which the second unit U2 is moved toward the first unit U1 with the shaft 220 engaging the bearing member 51. When the lever 33 is turned counterclockwise with the grip 34, it causes the connecting link 47, the lever 41 and the shaft 40 to turn the cam 60 counterclockwise. The bifurcated lever 61 is then turned slightly clockwise by the profile of the cam 60, and, when past the dead center of the cam 60, the bifurcated lever 61 is turned counterclockwise under the tension of the spring 63. The connecting link 62 is then caused to turn clockwise about the pin 621, pushing the support arm 22 leftward as shown which is turned clockwise about the shaft 220 until the thermal head 23 on the support arm 22 is pressed against the platen roller 12. In normal recording condition, the ink sheet I and the recording sheet S as they are superimposed are interposed between the thermal head 23 and the platen roller 12.

The thermal head 23 and the platen roller 12 start contacting each other when the lever 33 is angularly moved counterclockwise through about 50 degrees from the position shown in FIG. 6. Continued counterclockwise angular movement of the lever 33 releases the bifurcated lever 61 from pressing engagement with the cam 60, whereupon the thermal head 23 is resiliently pressed against the platen roller 12 solely under the force of the spring 63. When the lever 33 is turned counterclockwise through about 90 degrees from the position of FIG. 6, the second unit U2 is locked with respect to the first unit U1 (FIGS. 3(I) through 3(III)), the shaft 220 is fixedly positioned (FIGS. 5(I) and 5(II)), and the pinch rollers 28, 29 are pressed respectively against the tensioning rollers 21, 27 (FIG. 4) as described above. The first and second unit U1, U2 are now positioned as shown in FIG. 2.

Briefly summarized, the thermal-image-transfer recording apparatus of the present invention is capable of separation or engagement of the first and second units U1, U2, engagement or retraction of the pinch rollers 28, 29 with or away from the tensioning rollers 21, 27, and movement of the thermal head 23 toward or away from the platen roller 12, all by manual operation of the lever 33 in a stroke.

The recording sheet S is normally made of plain paper. For proper thermal image transfer, it is necessary that the recording sheet S be transported stably in the first unit U1 without suffering from wrinkles. The recording sheet S is subjected to wrinkles due primarily to skewing thereof while the sheet is being fed along. The tensioning roller 11 in the first unit U1 serves to prevent the recording sheet S from wrinkling and enable the same to be transported along stably.

Figure 7:
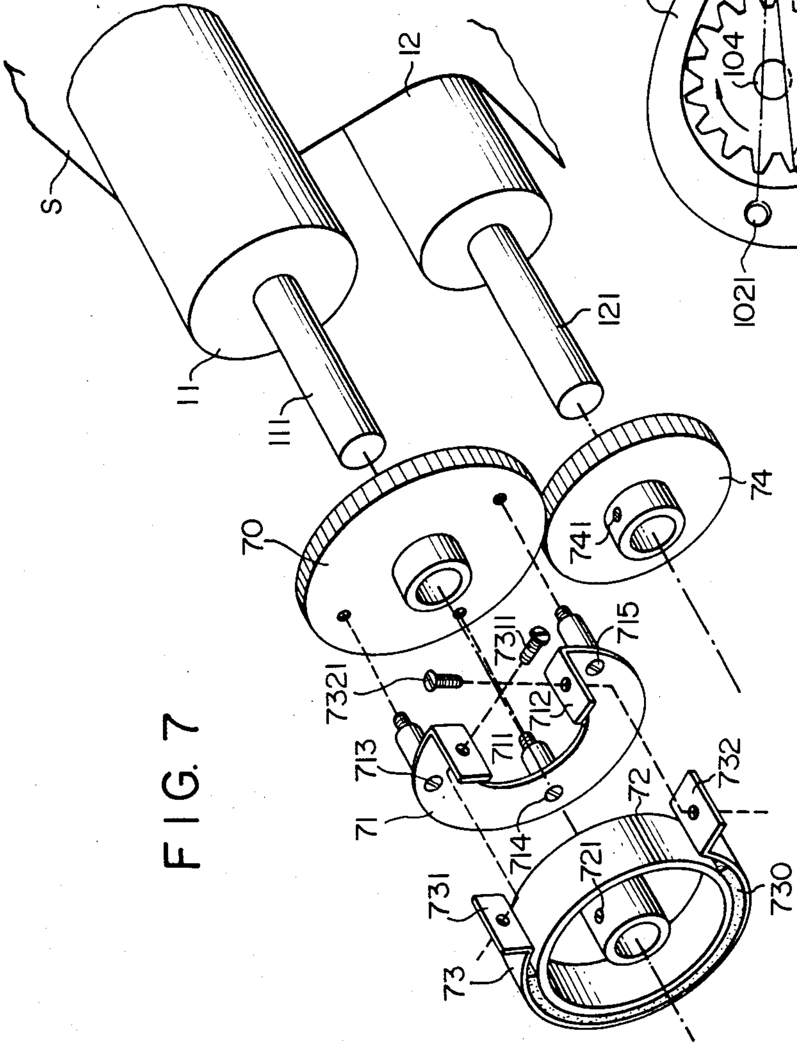
FIG. 7 is an exploded perspective view of a mechanism for tensioning a recording sheet in a backward direction.

The manner in which the recording sheet S is tensioned by the tensioning roller 11 will be described. The tensioning roller 11 is driven in coaction with the platen roller 12, as described above, through a mechanism which follows:

The tensioning roller 11 and the platen roller 12 have their shafts rotatably supported by the side plates 1. As shown in FIG. 7, a gear 74 is fitted over the shaft 121 of the platen roller 12 and fastened to the shaft 121 by a fastener means 741 such as a setscrew. A gear 70 and a brake drum 72 are fitted over the shaft 111 of the tensioning roller 11. The gear 70 is rotatable relatively to the shaft 111 and held in mesh with the gear 74. The brake drum 72 is fixed to the shaft 111 by a fastener means 721 such as a sêtscrew. A bracket 71 is fixed to the gear 70 by fastener means 713, 714, 715 such as screws, the bracket 71 having mounting fins 711, 712. A braking member 73 is disposed circumferentially around the brake drum 72 and has mounting fins 731, 732 fastened to the mounting fins 711, 712, respectively, by screws 7311, 7322. A braking shoe 730 is affixed to an inner circumferential surface of the braking member 73 and is pressed against the outer circumferential surface of the brake drum 72. The braking member 73 is thus capable of generating a frictional force between the gear 70 and the brake drum 72, the frictional force being adjustable in magnitude by the screws 7311, 7321.

As illustrated in FIG. 1, the recording sheet S is wound around the tensioning roller 11 through a sufficiently large angular interval by the winding roller 10 and the platen roller 12. Since the tensioning roller 11 has the layer of foam rubber having a large coefficient of friction, there will be no slippage between the recording sheet S and the tensioning roller 11 because of a sufficient friction force developed therebetween. The roll of recording sheet S is associated with a known friction brake which prevents the recording sheet S from being excessively unrolled.

It is now assumed in FIG. 7 that the gear 70 has a number of gear teeth Z1, and the gear 74 has a number of gear teeth Z2, and the tensioning roller 11 and the platen roller 12 have diameters D1, D2, respectively. When the platen roller 12 makes one revolution with no recording sheet S therearound, the tensioning roller 11 rotates through an angular interval equal to the ratio Z2/Z1. Since the circumferential surface of the platen roller 12 angularly moves through the interval $D2\pi$ in response to one revolution of the platen roller 12, the circumferential surface of the tensioning roller 11 angularly moves through the interval $Z2/Z1 \cdot D1\pi$.

When the recording sheet S is present around the platen roller 12 and the tensioning roller 11, and on the assumption that the condition $D2\pi = Z2/Z1 \cdot D1\pi$ is met, the recording sheet S is fed along by the tensioning roller 11 and the platen roller 12 for equal intervals, respectively, and no tension is applied to the recording sheet S between the rollers 11, 12.

With the recording apparatus of the invention, the diameters of the rollers 11, 12, and the numbers of gear teeth of the gears 70, 74 are determined such that the condition $D2\pi > Z2/Z1 \cdot D1\pi$ and hence $D2 > Z2/Z1 \cdot D1$ is met. By way of example, the numerical values are as follows: D2=20.7 mm, D1=24 mm, Z1=38, and Z2=32. Under such condition, the recording sheet S is tensioned between the platen roller 12 and the tensioning roller 11.

As described above, the platen roller 12 is driven by the stepper motor (not shown). When the platenroller 12 is rotated in a normal direction, the recording sheet S is subjected to tension, and the tensioning roller 11 is rotated at a speed lower than that of rotation of the gear 70 under the influence of such tension on the recording sheet S. The tension imposed on the recording sheet S can be regulated by adjusting the screws 7311, 7321 to regulate the frictional force between the braking member 73 and the brake drum 72.

Thus, the recording sheet S can be tensioned to the extent that stabilizes the feeding thereof for thereby preventing the recording sheet S from being skewed and wrinkled.

Referring back to FIG. 2, after the thermal-image-transfer recording process has been over, the cutter 14 is actuated to cut off the recording sheet S. There is a length of the recording sheet S between the cutter 14 and the recording zone, and such recording sheet length normally bears no recorded image. When a next cycle of thermal-image-transfer recording operation is carried out, the blank length of the recording sheet S precedes a succeeding recorded portion of the recording sheet S to be discharged. The blank sheet length makes the recorded sheet unsightly in apperance, and is wasteful.

Such a problem is solved in the recording apparatus by winding back the blank length of the recording sheet S between the recording zone and the cutter 14 toward the recording zone after the thermal image transfer process. The recording sheet S can be wound back by reversing the rotation of the stepper motor which drives the platen roller 12.

At the time the recording sheet S is wound back, the ink sheet I is also wound back by the platen roller 12. Since the ink sheet I is thin in general, however, it tends to slacken and wrinkle in its unused portion. To prevent this difficulty, the ink sheet I is also positively wound back by a mechanism shown in FIG. 8 in response to winding back of the the recording sheet S.

Figure 8:
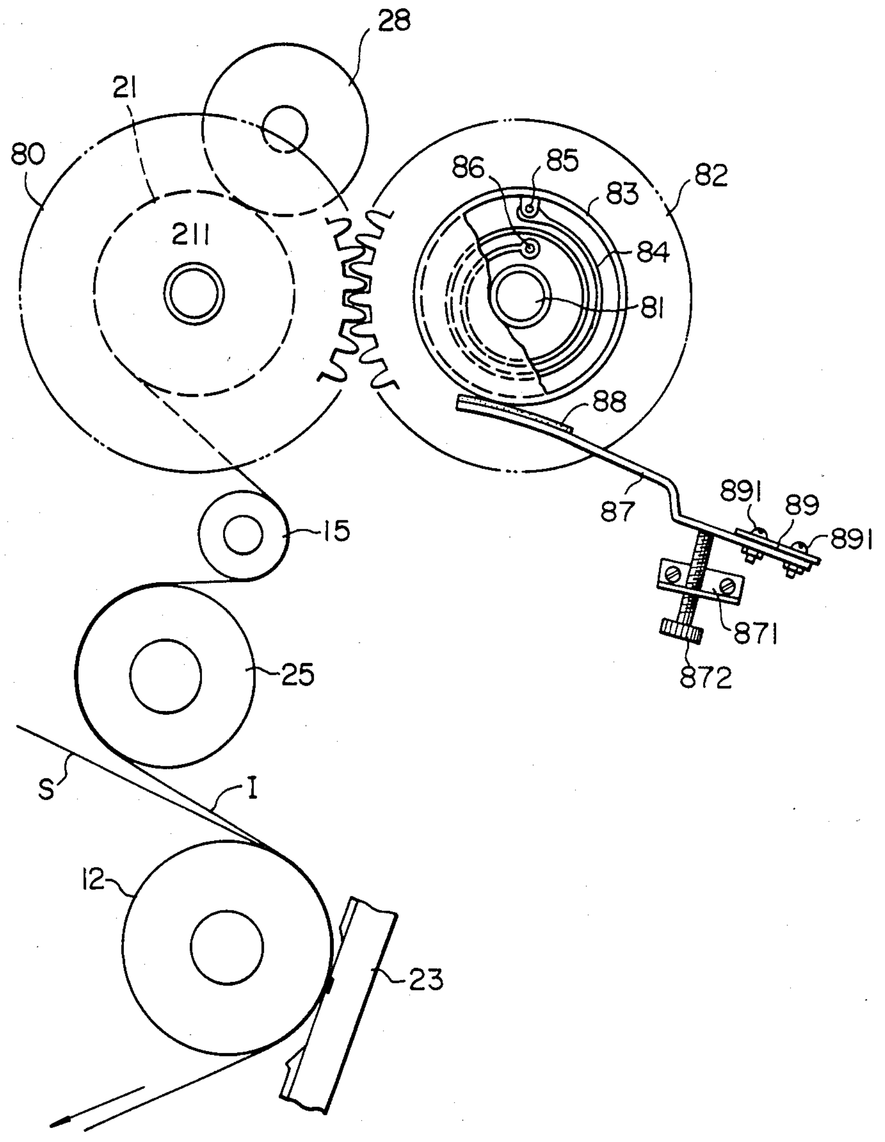
FIG. 8 is a side elevational view, partly cut away, of a mechanism for winding back an ink sheet.

As illustrated in FIG. 8, a gear 80 is fixedly mounted on the shaft 211 of the tensioning roller 21. A shaft 81 is fixed to the side plate 2 (FIG. 1) of the second unit U2 and extends parallel to the shaft 211 of the tensioning roller 21. A gear 82 is rotatably fitted over the shaft 81 and held in mesh with the gear 80. The shaft 81 supports a drum 83 rotatably fitted thereover and housing therein a spiral spring 84 having one end fixed by a retainer 85 to the drum 83 and an opposite end fixed to a pin 86 projecting from the gear 82.

A support 89 is affixed to an immovable member of the recording apparatus, and a leaf spring 87 has one end secured to the support 89 by fastener means 891 such as screws. Another support 871 is fastened to the side plate 2 and supports thereon an adjustment screw 872 having a tip end abutting against the leaf spring 87. The leaf spring 87 has a free end to which there is attached a braking shoe 88 pressed against an outer circumferential surface of the drum 83. The force with which the braking shoe 88 is pressed against the outer circumferential surface of the drum 83 can be regulated by the adjustment screw 872.

When a thermal-image-transfer recording process is to be effected, the platen roller 12 is rotated clockwise (FIG. 8) about its own axis to transport the ink sheet I and the recording sheet S. As the ink sheet I is fed along, the tensioning roller 21 is rotated counterclockwise and so is the gear 80 in unison with the tensioning roller 21. The gear 82 is rotated clockwise in mesh with the gear 80, whereupon the spiral spring 84 is tightened. As the spiral spring 84 is tightened to a certain extent, the torque transmitted from the gear 82 to the drum 83 is increased to the point where the drum 83 starts slip on the braking shoe 88 and rotates clockwise in unison with the gear 82. At this time, a frictional force is developed between the drum 83 and the braking shoe 88 to present resistance to the counterclockwise rotation of the tensioning roller 21, producing a portion of back tension applied to the ink sheet I.

After the thermal-image-transfer recording process has been finished, the platen roller 12 is rotated counterclockwise to wind back the recording sheet S and the ink sheet I. Upon stoppage of the clockwise rotation of the platen roller 12, the drum 83 also stops its rotation. At the time of subsequence reverse rotation of the platen roller 12, the spiral spring 84 that has been tightened is unwound to release its stored energy. Since the drum 83 is subjected to the frictional force from the braking shoe 88, the gear 82 is rotated counterclockwise by the resiliency of the spiral spring 84 with respect to the drum 83. The counterclockwise rotation of the gear 82 is transmitted through the gear 80 to the tensioning roller 21, which is then rotated clockwise to pull back the ink sheet I. Consequently, the ink sheet I is wound back in response to reverse rotation of the platen roller 12, and the length of the ink sheet I between the platen roller 12 and the tensioning roller 21 undergoes no slackening.

As described above, the thermal head 23 is movable away from the platen roller 12 to facilitate the setting of the recording sheet S and the ink sheet I in the first and second units U1, U2, respectively. With the conventional thermal-image-transfer recording apparatus, however, the recording and ink sheets are sandwiched between the platen roller and the thermal head even when no thermal-image-transfer recording process is performed.

The recording and ink sheets are susceptible to humidity in that they tend to swell by absorbing moisture in a highly humid environment. However, the portions of these sheets which are sandwiched between the platen roller and the thermal head are protected from exposure to moisture. When the sheets are left under a highly humid condition for an extended period of time, such sandwiched sheet portions are prevented from swelling, but adjacent sheet portions are caused to swell due to moisture absorption. The sheets are thus subjected to irregular deformations which appear as ripple-like wrinkles along the boundary between the sandwiched sheet portions and the swollen sheet portions. The ripple-like wrinkles will then be a source of recorded defects on the recording sheet.

The recording apparatus of the present invention eliminates the foregoing shortcoming by separating thermal head and the platen roller slightly from each other when no recording is to be effected for an increased period of time. Such separation is initiated by an EOP signal in the case where the recording apparatus is used as a recorder in a facsimile receiver, or by a print completion signal in the case where the recording apparatus is used as a printer. Therefore, the portions of the recording and ink sheets which are located in the recording zone are allowed to swell due to moisture absorption to the same degree as that of the adjacent sheet portions. With the sheet portions in the recording zone being equally subjected to ambient humidity, no ripple-like wrinkles are created on the recording and ink sheets.

Figure 9:
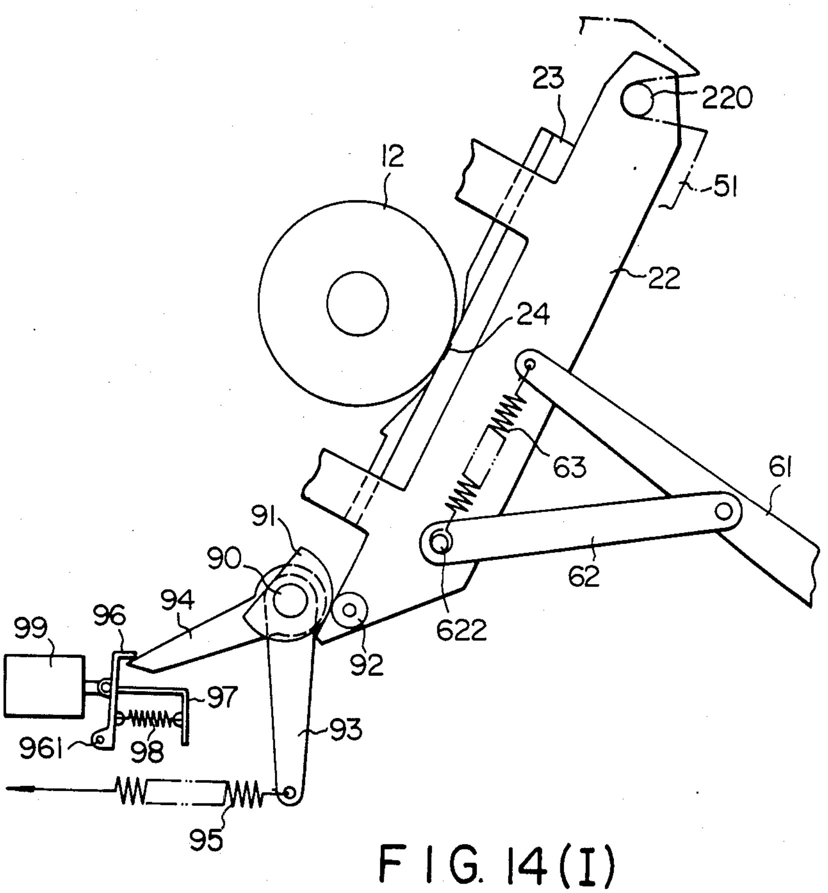
FIG. 9 is a fragmentary side elevational view of a mechanism for separating the thermal head slightly from the platen roller.

The thermal head and the platen roller are separated from each other by a mechanism shown in FIG. 9.

As described above, the thermal head 23 is pressed against the platen roller 12 under the resilient force of the tension spring 63.

A shaft 90 is pivotably mounted on the side plate 1 (FIG. 1) of the first unit U1, there being a cam 91 fixed to the shaft 90. The cam 91 is brought into pressing engagement with a cam follower 92 mounted on the support art 22 when the thermal head 23 is pressed against the platen roller 12 as illustrated in FIG. 9. A pair of levers 94, 94 is fixed to the shaft 90. A tension spring 95 acts between an immovable member (not shown) and a free end of the lever 93 for normally urging the shaft 90 to turn clockwise about its own axis. The shaft 90 thus urged is stopped by the lever 94 with its free end engaged by a locking finger 96.

The locking finger 96 is pivotably mounted on the side plate 1 by a pin 961, and is normally biased to turn clockwise about the pin 961 by a tension spring 98 into abutting engagement with a stop 97 affixed to the side plate 1, the tension spring 98 acting between the locking finter 96 and the stop 97. The locking finger 96 is connected to an actuator rod of a solenoid 99.

When the EOP signal or print completion signal is generated after a theraml-image-transfer recording process has been finished, the solenoid 99 is energized to turn the locking finger 96 counterclockwise. The lever 94 is then released to allow the shaft 90 to pivot clockwise under the tension of the spring 95, thus angularly ming the cam 91 to push the cam follower 92 on the support arm 22 to the right (as shown in FIG. 9). Therefore, the cam 91 causes the support arm 22 to angularly move counterclockwise about the shaft 220 for thereby separating the thermal head 23 slightly from the platen roller 12.

When a thermal-image-transfer recording process is to be subsequently started again, it is necessary in advance to lock the lever 94 with the locking finger 96 and sandwich the recording sheet S and the ink sheet I between the thermal head 23 and the platen roller 12. Such restoration of the parts is carried out by a mechanism illustrated in FIGS. 10(I) and 10(II).

A horseshoe-shaped guide 102 is fixed to the side plate 1 at a position leftward (as shown) of the shaft 90. The tension spring 95 which urges the lever 93 to turn clockwise is attached to the free end of the lever 93 and a pin 1021 affixed to the guide 102. A guide link 101 is pivotably mounted by a pin 1011 on the free end of the lever 93, and has on a distal end thereof a pin 1013 and an abutment member 1012 disposed therearound.

A pin gear 103 is mounted on a shaft 104. The pin gear 103 is coupled through a one-way clutch to the motor rotatable in one direction only for winding up the ink sheet I. When this motor is energized, the pin gear 103 is rotated clockwise (FIGS. 10(I) and 10(II)) about the shaft 104. The pin gear 103 is freely rotatable counterclockwise about the shaft 104 by the one-way clutch.

Figure 10:
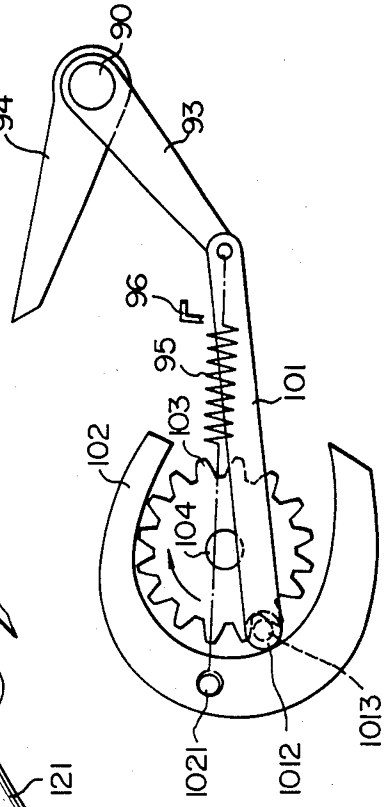
FIGS. 10(I) and 10(II) are side elevational views of a mechanism for re-pressing the thermal head against the platen roller.
Figure 10I:
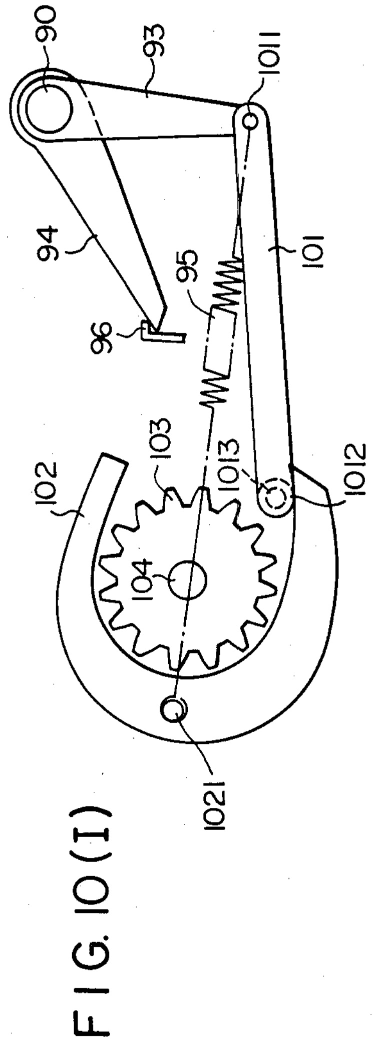

FIG. 10(I) shows the position in which the lever 94 is locked by the locking finger 96 as shown in FIG. 9. In this position, the pin gear 103 is driven to rotate clockwise about the shaft 104. When the solenoid 99 (FIG. 9) is energized to unlock the lever 94, the lever 93 is turned clockwise about the shaft 90 under the tension of the tension spring 95. The thermal head is now slightly spaced from the platen roller 12 as described above.

The clockwise angular movement of the lever 93 causes the abutment member 1012 on the guide link 101 to slide on the guide 102 into mesh with the pin gear 103, thereby rotating the latter clockwise to the position of FIG. 10(II). As the pin gear 103 rotates clockwise in response to energization of the motor, the pin 1013 is angularly moved along with the pin gear 103 to the point where the lever 93 starts turning counterclockwise as the spring 95 begins to stretch. The lever 94 is also turned counterclockwise until it is locked by the locking finger as shown in FIG. 10(I). At this time, the recording and ink sheets are sandwiched between the thermal head and the platen roller in the recording zone.

The pin 1013 on the guide link 101 is then caused by gravity to drop off one of the teeth of the pin gear 103 which is located at a lower righthand side thereof, and the guide link 101 angularly moved counterclockwise about the pin 1011 to let the abutment member 1012 fall onto the guide 102 as shown in FIG. 10(I).

The recording apparatus is now readied for a new recording process.

A takeukp mechanism for winding the ink sheet will now be described with reference to FIG. 11.

Figure 11:
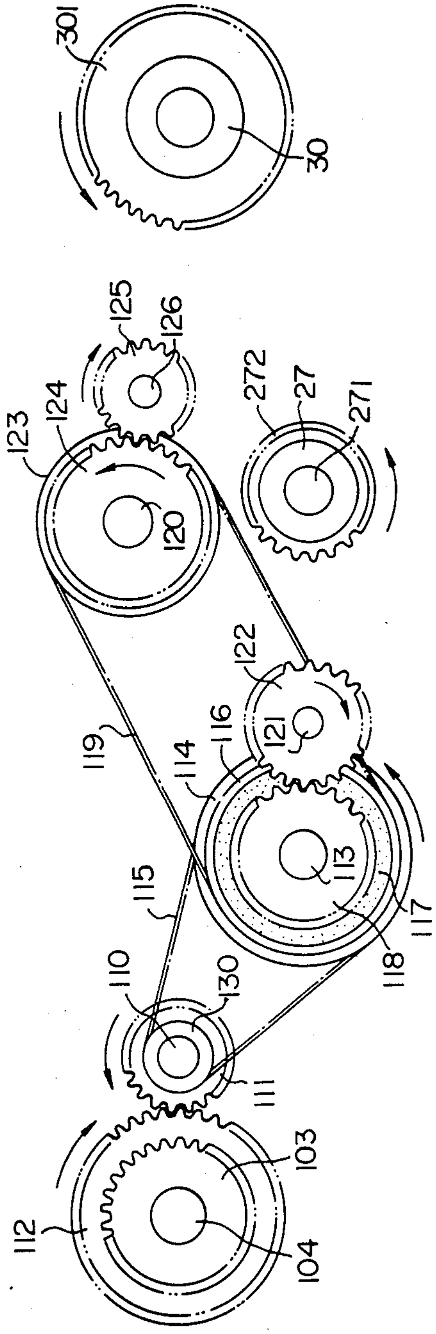
FIG. 11 is a side elevational view of a mechanism for winding up the ink sheet.

As shown in FIG. 11, shafts 110, 113, 121, 120, 126 are rotatably mounted on the side plates 1 (FIG. 1). The shaft 110 is directly driven by the motor which rotates in one direction only. A timing pulley 130 and a gear 111 are fixedly mounted on the shaft 110. The gear 111 is held in mesh with a gear 112 mounted on the shaft 104 of the pin gear 103. The one-way clutch operatively coupled with the pin gear 103 is interposed between the gear 112 and the pin gear 103. When the motor is driven, the shaft 110 coupled therewith is rotated counterclockwise to rotate the pin gear 103 clockwise.

On the shaft 113, there are coaxially mounted a timing pulley 114, a pully 116, a friction disk 117, and a gear 118, which are all rotatable with respect to the shaft 113. The timing pulley 114 and the pulley 116 are integrally coupled for corotation. The friction disk 117 is clamped between the pulleys 114, 116 and the gear 118 to frictionally couple the pulleys 114, 116 and the gear 118 together. A timing belt 115 is trained around the timing pulleys 114, 130.

A gear 122 is rotatably mounted on the shaft 121 and held in mesh with the gear 118.

A pulley 123 and a gear 124 are rotatably mounted on the shaft 120, and integraly coupled for corotation. A belt 119 in the form of a coil spring is trained around the pulleys 123, 114.

A gear 124 is rotatably mounted on the shaft 126 and held in mesh with the gear 124.

Therefore, when the shaft 110 is rotated counterclockwise by the motor, the gears 122, 125 are rotated clockwise.

The tensioning roller 27 in the second unit U2 has a shaft 271 on which a gear 272 is fixedly mounted. The takeup roller 30 has a shaft with a gear 301 fixedly mounted thereon.

In the position of FIG. 11, the first and second units U1, U2 are separated from each other as shown in FIG. 1. As the second unit U2 is moved toward the first unit U1, the gears 272, 301 are brought into mesh with the gears 122, 125, respectively. When the second unit U2 is locked with respect to the first unit U1 (see FIGS. 3(I) through 3(III)), these gears are locked in driving mesh with each other.

Drive power from the motor can now be transmitted to the tensioning roller 27 and the takeup roller 30. In response to counterclockwise rotation of the shaft 110, the rollers 27, 30 are rotated counterclockwise to wind the ink sheet I on the roller 30.

The pulley 116 and the gear 118 are frictionally coupled with each other by the friction disk 117 for enabling the tensioning roller 27 to be rotated counterclockwise by the drive power from the motor. When the tensioning roller 27 is subjected to a certain load, the gear 118 slips with respect to the friction disk 117, stopping the tensioning roller 27. This prevents the ink sheet I to be excessively tensioned by the tensioning roller 27 between the recording zone and the tensioning roller 27. The degree of frictional coupling between the gear 118 and the disk 117 is adjustable to keep the ink sheet I under a suitable tension.

The belt 119 trained around the pulleys 116, 123 is frictionally coupled with the pulley 123 so that the takeup roller 30 will not be subjected to an excessive torque largér than a certain torque. The torque imposed on the takeup roller 30 is adjustable to enable the latter to wind thereon the ink sheet I fed from the tensioning roller 27 at a suitable rate.

Accordingly, the ink sheet I is suitably tensioned in the manner described above. When the thermal head is slightly spaced from the platen roller, the recording and ink sheets are released therefrom, and would tend to slacken as it is fed along by the tensioning roller 27. This would cause the ink sheet I to wrinkle and unwanted defective recorded images might result during a next following recording process.

Figure 12:
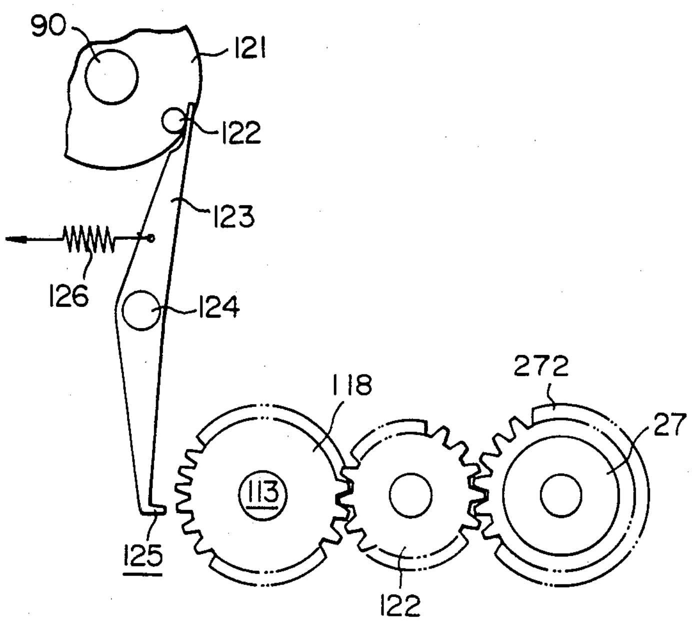
FIG. 12 is a side elevational view of a mechanism for cutting off power transfer to a tensioning roller.
Figure 12:
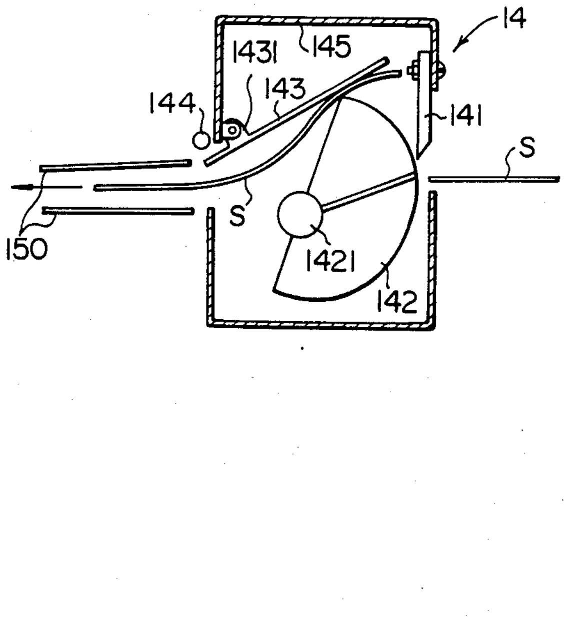

According the recording apparatus of the invention, at the time of separating the thermal head slightly from the platen roller, the gear 118 is inactivated by a mechanism shown in FIG. 12, thus cutting off drive power to the tensioning roller 27.

As described with reference to FIG. 9, the thermal head 23 can be separated from the platen roller 12 by turning the cam 91 clockwise about the shaft 90. As shown in FIG. 12, the shaft 90 supports a disk 121 fixedly mounted thereon and having a pin 122 secured thereto.

A pin 124 is fixedly attached to the side plate 1 (FIG. 1) and a lever 123 is swingably mounted on the pin 124. The lever 123 has an upper end held in abutment against the pin 122. A tension spring 126 is coupled between an immovable member and the lever 123 for normally urging the latter to turn counterclockwise about the pin 124 for thereby pressing the upper end of the lever 123 against the pin 122. The lever 123 has at a lower end a locking finger 125 disposed in confronting relation to the gear 118.

FIG. 12 shows the parts position in which the thermal head 23 and the platen roller 12 sandwich the recording and ink sheets therebetween as illustrated in FIG. 9.

When the solenoid 99 (FIG. 9) is energized, the shaft 90 is turned clockwise to cause the thermal head 23 to be spaced away from the platen roller 12. The clockwise movement of the shaft 90 enables the disk 121 to turn clockwise therewith, releasing the pin 122 from abutting engagement with the lever 123. The lever 123 is now turned momentarily counterclockwise under the tension of the spring 126 to bring the locking finger 125 into engagement with the gear 118, which is then stopped. As a result, the drive power flow to the tensioning roller 27 is cut off at the same time that the thermal head is separated from the platen roller.

For initiating a new recording process, the shaft 90 is turned counterclockwise as shown in FIGS. 10(I) and 10(II) to force the thermal head toward the platen roller to sandwich the recording and ink sheets therebetween. The lever 123 is caused by the pin 122 to lift the locking finger 125 off the gear 118 as shown in FIG. 12. The gear 128 is now rendered rotatable, and drive power can be transmitted through the gears 122, 272 to the tensioning roller 27.

Separation of the recording and ink sheets subsequent to a thermal-image-transfer operation will now be described. At the time of thermal image transfer, a pattern of ink on the ink sheet is fused by the thermal head and transferred to the recording sheet. The fused mass of ink also remains attached to the ink sheet under a small force, and will be separated from the ink sheet when the recording and ink sheets are separated from each other. Consequently, the recording and ink sheets as they have passed through the recording zone remain stuck to each other by the fused mass of ink. The recording and ink sheets as they are attached together subsequent to the recording operation can be transported together from the recording zone to the cutter without the aid of any guide.

In general, the force with which the sheets remain stuck together is relatively small. When the ink sheet I abruptly changes its direction of travel at the separation roller 26 immediately before the cutter 12 as shown in FIG. 2, the recording sheet S is separated of its own accord from the ink sheet I due to the stiffness of the recording sheet S and enters the cutter 14.

When the area or density of an image to be transferred is large, e.g., when an image to be transferred is composed of a wide continuous mass of ink, the sheets S, I tend to remain stuck to each other under a greater force. Under this condition, the recording sheet S may be pulled by the ink sheet I for being wound together on the takeup roller 30, or the ink sheet I may be dragged by the recording sheet S into the cutter 14. Such a separation failure can be avoided by a separator 132 (FIG. 13) located adjacent to the separation roller 26.

Figure 13:
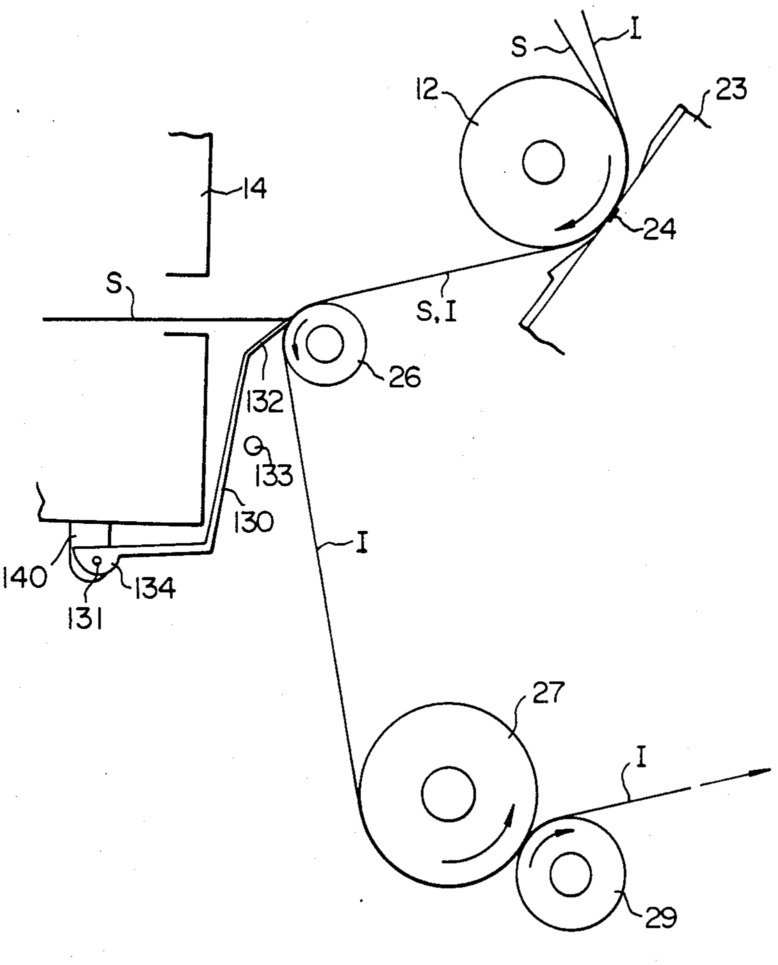
FIG. 13 is a side elevational view illustrative of the manner in which ink and recording sheets are separated from each other.

In FIG. 13, the separator 130 comprises a narrow plate extending longitudinally in a direction normal to the sheet of FIG. 13. The separator 130 has a proximal end 134 pivotably mounted by a pin 131 on a support 140 attached to a casing of the cutter 14. The separator 130 has a slightly bent opposite end 132 having an abutment edge.

The separator 130 is caused by gravity to turn the abutment edge under a clockwise moment into abutment against the ink sheet I on the peripheral surface of the separation roller 26 along the axis thereof, for thereby separating the recording sheet S reliably from the ink sheet I. Since the sheets S, I can completely be separated from each other by the separator 130, there is no tendency of the recording sheet S to be wound with the ink sheet I on the takeup roler or of the ink sheet I to be dragged by the recording sheet S into the cutter 14.

On separation of the second unit U2 from the first unit U1, the separator 130 is angularly moved downwardly due to gravity into abutment against a stop 133 fixed to the casing of the cutter 14.

The cutter 14 will now be described.

Figure 14I:
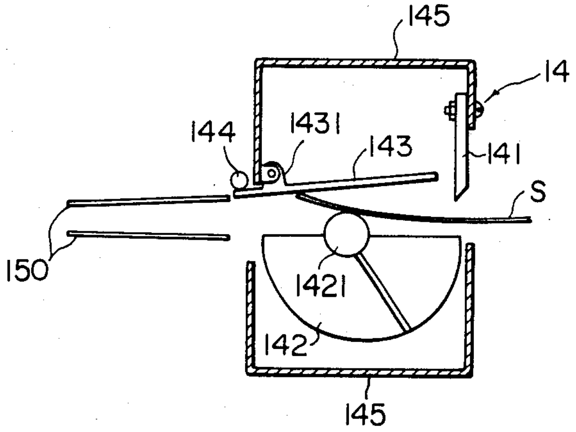

As shown in FIGS. 14(I) and 14(II), the cutter 14 is in the form of a rotary cutter comprising a fixed cutter blade 141, a movable cutter blade 142, a movable guide plate 143, a stop 144, and a casing 145.

The movable cutter blade 142 is angularly movable about a shaft 1421 and has a cutter edge which is progressively higher from one end toward the other in a direction normal to the sheet of FIGS. 14(I) and 14(II).

In response to a cutting signal applied, the movable cutter blade 142 is angularly moved by the shaft 1421 counterclockwise from the position of FIG. 14(I). The cutter edge of the movable cutter blade 142 starts engaging the fixed cutter blade 141 at one end to cut off the recording sheet S from one edge toward the other. The recording sheet S is completely severed when the movable cutter blade 142 is turned to the position of FIG. 14(II). Then, the movable cutter blade 142 is angularly moved clockwise back to the position shown in FIG. 14(I).

The movable guide plate 143 is in the form of a narrow plate extending longitudinally in a direction normal to the sheet of FIGS. 14(I) and 14(II). The movable guide plate 143 is pivotably attached at one edge thereof to the casing 145 by a pin 1431, and is normally held in engagement with a lower surface of the stop 144. During cutting operation, the movable guide plate 143 is caused to swing about the pin 131 in response to the angular movement of the movable cutter blade 142. The movable guide plate 143 serves to prevent the recording sheet S from being folded on itself.

The tendency of the recording sheet S to get folded on itself and operation of the movable guide plate 143 to prevent such a tendency will be described with reference to FIGS. 15(I) through 15(III).

The recording sheet S is more likely to be folded on itself when a new recording process is to be effected after the recording apparatus has not been used for a long period of time. Upon completion of a thermal-image-transfer recording process, the recording sheet S is wound back for a predetermined length by the platen roller 12 in the manner described above. The leading edge of the recording sheet S as thus wound back is curled as it is kept in the recording zone for an increased period of time.

The cutter 14 requires a space above the movable cutter blade 142, which is large enough to accommodate therein the movable cutter blade 152 as it is angularly moved upwardly.

Figure 15I:
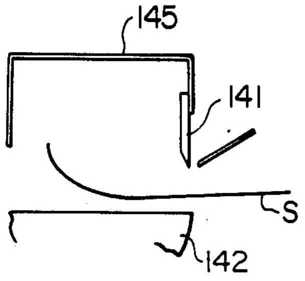
FIGS. 15(I) through 15(III) are schematic views showing how a folded sheet edge is formed.
Figure 15:
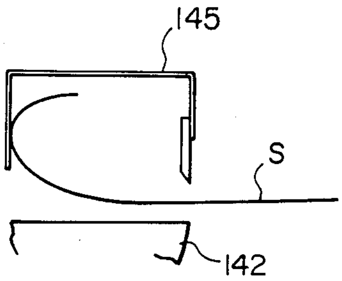

If it were not for the guide plate 143, then the recording sheet S with its leading edge curled would enter as shown in FIG. 15(I), be turned over within the cutter casing as shown in FIG. 15(II), and then go out of the cutter 14 with its leading edge nearly folded on itself as illustrated in FIG. 15(III). Then, the leading edge of the recording sheet S would be folded on itself to thereby form a folded edge as the leading edge would be guided by the guide 150 and discharged by the discharge rollers 13 (FIG. 1). Even if the leading edge were not curled enough to form a folded edge, there would be a tendency to cause a paper jam.

With the guide plate 143, however, the recording sheet S is guided thereby without being turned over as shown in FIGS. 15(I) and 15(II), so that the recording paper S is prevented from being folded on itself or from causing a paper jam. Since the guide plate 143 is swingably movable, it does not interfere with angular movement of the movable cutter blade 142.

Instead of allowing the guide plate 143 to move pivotably, the guide plate 143 may be made of a resiliently flexible material for yielding itself to angular movement of the movable cutter blade 142. The movable cutter blade 142 may be swingably disposed in the cutter casing 145.

One cycle of operation of the recording apparatus according to the present invention will briefly be summarized.

The recording sheet S and the ink sheet I can be set respectively in the first and second units U1, U2 speedily with utmost ease by separating the first and second units U1, U2 from each other.

For separating the first and second units U1, U2, the grip 34 is manipulated to turn the lever 33 clockwise through about 90 degrees as shown in FIG. 3(III), and then pulled to the right. The second unit U2 is now unlocked from the first unit U1, and moved rightward along the guide rail (not shown).

With the units U1, U2 thus separated, the recording sheet S and the ink sheet I are set respectively therein (see FIG. 1). At this time, the pinch rollers 28, 29 are retracted from the passage of travel of the ink sheet I as illustrated in FIG. 1.

Then, the lever 33 is pushed to the left as shown in FIG. 3(I) to move the second unit U2 into abutment against the first unit U1, and thereafter the lever 33 is turned counterclockwise through approximately 90 degrees as shown in FIGS. 3(II) and 3(III), thus locking the second unit U2 with respect to the first unit U1.

In response to the counterclockwise angular movement of the lever 33, the pinch rollers 28, 29 are pressed against the tensioning rollers 21, 27, respectively, with the ink sheet I interposed therebetween, as shown in FIG. 4. The thermal head 23 is properly positioned relatively to the platen roller 12 (see FIGS. 5(I) and 5(II)) to press the recording sheet S and the ink sheet I against the platen roller 12 (see FIG. 6). The recording apparatus is now readied for recording operation as illustrated in FIG. 2.

When the recording apparatus is energized, the motor rotatable in one direction only is turned on to rotate the tensioning roller 27 and the takeup roller 30 (FIG. 11). As a recording process is started, the platen roller 12 is rotated by the stepper motor to transport along the recording sheet S and the ink sheet I.

During this time, the ink sheet I is sufficiently tensioned backward by the tensioning roller 25. Since the tensioning roller 25 is located closely to the platen roller 12 so that the straight length of the ink sheet I between the rollers 25, 12 is small, the ink sheet I is effectively prevented from being wrinkled in that length (FIG. 2).

The recording sheet S is also sufficiently tensioned backward by the tensioning roller 11 as shown in FIG. 7, and thus can be fed along stably.

After the recording operation is over, the recording sheet S is separated from the ink sheet I by the separator 130 and the separation roller 26, and then cut off by the cutter 14 (FIG. 14). The cut length of the recording sheet S is then discharged out of the recording apparatus by the discharge rollers 13. The cut length as thus discharged is prevented by the guide plate 143 from being folded on itself as illustrated in FIGS. 14(I) and 14(II).

After the recording sheet S has been severed by the cutter 14, the recording sheet S is wound back by reverse rotation of the stepper motor until the leading edge of the recording sheet S reaches the recording zone. The ink sheet I is simultaneously wound back by the tensioning roller 21 (FIG. 8).

Then, the thermal head 23 is slightly spaced from the platen roller 12 (FIG. 9) until a next recording process is initiated, and at the same time any drive power to the tensioning roller 27 is cut off (FIG. 12).

When the new recording process is started, the thermal head 23 is actuated by the motor to cooperate with the platen roller 12 in sandwiching the ink and recording sheets (FIGS. 10(I) and 10(II)), and the tensioning roller 27 is now actuated (FIG. 12). The foregoing recording process is then repeated.

While in the illustrated embodiment the thermal head is movable toward and away from the platen roller, the platen roller may be movable toward and away from the thermal head, or alternatively both the thermal head and the platen roller may be movable toward and away from each other. The recording head may comprise an electrically conductive head. The recording head may be disposed behind the recording sheet, and the platen roller may be positioned behind the ink sheet.

Although in the illustrated embodiment the platen roller and the recording head are manually separable away from and movable toward each other, they may be automatically brought toward and away from each other.

The ink and recording sheets may be set in the respective units by first separating the units as shown in FIG. 1, and then pulling the first or second unit in the direction normal to the sheet of FIG. 1.

In the illustrated embodiment, any wrinkles due to thermal deformations of the ink sheet are prevented from spreading over an unused portion of the ink sheet by locating the tensioning roller 25 as closely as possible to the platen roller 12 during recording operation, thereby reducing the flat and straight length of the ink sheet between the rollers 12, 25 to the extent possible so that the flat and straight length of the ink sheet can be sufficiently tensioned by the tensioning roller 25. The tensioning roller 25 may be located in contact with the platen roller 12.

The tendency of the ink sheet to be deformed due to heat is an inherent problem with thermal-image-transfer recording processes. Such thermal deformations of the ink sheet are created irrespectively of whether the recording and ink sheets are fed along indepedent passages or not. Solving the problem of recording errors or failures due to wrinkles on an unused ink sheet portion has been a task to be performed generally in the thermal-image-transfer recording processes. Accordingly, the use of the tensioning roller 25 to eliminate the wrinkle-induced recording errors or failures is equally applicable to such thermal-image-transfer recording apparatus which do not incorporate separate individual passages for ink and recording sheets, and also to such thermal-image-transfer recording apparatus which employ ink and recording sheets cut to desired size rather than web-shaped sheets.

According to the illustrated embodiment, the recording sheet can be stably fed along without being subjected to wrinkles caused by skewing thereof by employing a means for rotating rollers at different peripheral speeds, which comprises the gear 74 fixedly mounted on the platen roller 12 and the gear 70 rotatably fitted over the tensioning roller 11, and a frictional power transmission mechanism comprising the brake drum 72, the bracket 71, the braking member 73 and the other components.

It is important that the ink sheet be also fed along stably, and the ink and recording sheets as they are superimposed be fed along stably. The mechanism for feeding the sheet stably, which is composed of the tensioning roller, the means for rotating rollers at different peripheral speeds, and the frictional power transmission mechanism, as described above, can be employed for feeding the ink sheet stably, and can also be used for feeding the ink and recording sheets as superimposed one on the other along a single passage.

The gear 70 may be replaced with a friction wheel fixedly mounted on the shaft 111, and the gear 74 may be replaced with another friction wheel fixedly mounted on the shaft 121, the friction wheels being pressed against each other under an adjustable frictional force. These paired friction wheels serve both as the means for rotating rollers at different peripheral speeds and the frictional power transmission mechanism.

Any slackening of the ink sheet at the time of winding back the recording sheet is prevented by a slackening prevention means composed of the tensioning roller 21 and a resilient energy storing means for urging the tensioning roller 21 to turn in a reverse direction. Such a slackening prevention means may be incorporated in apparatus having a single passage of travel of superimposed ink and recording sheets as the ink sheet superimposed on the recording sheet can still be slackened when the recording sheet is wound back.

To eliminate any recording errors due to swollen ink and recording sheets in a highly humid condition, the thermal head is released of pressing engagement with the platen roller while no recording is effected for a prolonged interval of time. The same preventive measure can be relied on in apparatus in which superimposed ink and recording sheets travel along a single passage since the problem of moisture-induced printing errors can occur regardless of whether the ink and recording sheets are fed along respective independent passages or a single common passage.

The sheet separation mechanism composed of the separation roller and the separator is employed for fully separating the ink and recording sheets in recording operation to prevent any separation failure due to the sheet's sticking to each other by an intervening mass of ink. The same sheet separation mechanism can be incorporated in apparatus in which the sheets are transported along one common passage until they leave the recording zone.

The guide plate 143 is used for preventing any folded edges or paper jams due to the tendency of the recording sheet to get curled. Because such folded edge or paper jam can take place in any type of apparatus in which a sheet tending to be curled is cut off by a rotary cutter, the guide plate can find a wide variety of applications other than the thermal-image-transfer recording apparatus.

Although a certain preferred embodiment has been shown and described, it should be understood that many changes and modifications may be made therein without departing from the scope of the appended claims.

What is claimed is:

1. A thermal-image-transfer recording apparatus having a recording head responsive to information-dependent signals applied thereto for fusing with heat a thermally fusible ink layer on a base of an ink sheet in the selected pattern of an image and transferring the image of fused ink to a recording sheet superimposed on the ink sheet while the sheets are fed along across the recording head, thereby producing the image dependent on the signals on the recording sheet, said recording apparatus comprising:

(a) a first unit having a passage of travel of the recording sheet;
(b) a second unit having a passage of travel of the ink sheet, one of said first and second units having the recording head and the other unit having a platen roller;
(c) a locking mechanism for actuating said first and second units into and out of engagement with each other; and
(d) a positioning mechanism for positioning said recording head and said platen roller with respect to each other when the image is recorded on the recording sheet with the first and second units engaging with each other, said recording head and said platen roller jointly defining a recording zone, said platen roller being rotatable to feed the ink and recording sheets through said recording zone;
 wherein said first unit is fixed and said second unit is movable with respect to said first unit into and out of engagement with the latter; and
 wherein said locking mechanism comprises a rail guide mechanism for moving said second unit therealong, a lever pivotably mounted on said second unit, a locking member mounted on said seocnd unit in coaxial relation to said lever, and a pin mounter on said first unit for releasably engaging said locking member.

2. A thermal-image-transfer recording apparatus having a recording head responsive to information-dependent signals applied thereto for fusing with heat a thermally fusible ink layer on a base of an ink sheet in the selected pattern of an image and transferring the image of fused ink to a recording sheet superimposed on the ink sheet while the sheets are fed along across the recording head, thereby producing tghe image dependent on the signal on the recording sheet, said recording apparatus comprising:

(a) a first unit having a passage of travel of the recording sheet;
(b) a second unit having a passage of travel of the ink sheet, one of said first and second units having the recording head and the other unit having a platen roller;
(c) a locking mechanism for actuating said first and second units into and out of engagement with each other; and
(d) a positioning mechanism for positioning said recording head and said platen roller with respect to each other when the image is recorded on the recording sheet with the first and second units engaging with each other, said recording head and said platen roller jointly defining a recording zone, said platen roller being rotatable to feed the ink and recording sheets through said recording zone;
 wherein said first unit is fixed and said second unit is movable with respect to said first unit into and out of engagement with the latter; and
 wherein said platen roller is disposed in said first unit and said recording head is disposed in said second unit, said positioning mechanism comprising a bearing member fixedly mounted on said first unit and having a recess, a shaft loosely fitted in said first unit for fitting engagement with said bearing member when said first and second units engage each other, a support arm supporting said recording head and said shaft, a lever mechanism for swinging said support arm about said shaft, a lever pivotably mounted on said second unit and having a hole defined on one end thereof, said shaft being loosely fitted in said hole, and a resilient member mounted of said second unit for urging said lever to press said shaft into said recess in said bearing member when said first and second units engage each other.

3. A thermal-image-transfer recording apparatus according to claim 2, wherein said locking mechanism comprises a rail guide mechanism for moving said second unit therealong, a second lever pivotably mounted on said second unit, a locking member mounted on said second unit in coaxial relation to said second lever, and a pin mounted on said first unit for releasably engaging said locking member, said lever mechanism including said second lever for swinging said support arm.

4. A thermal-image-transfer recording apparatus according to claim 3, wherein said second unit has a pair of tensioning rollers for tensioning the ink sheet, a pair of pinch rollers for coacting with said tensioning rollers, respectively, and a second lever mechanism for moving said pinch rollers into and out of contact with said tensioning rollers, respectively, said second lever mechanism being actuatable by said second lever.

5. A thermal-image-transfer recording apparatus having a recording head responsive to information-dependent signals applied thereto for fusing with heat a thermally fusible ink layer on a base of an ink sheet in the selected pattern of an image and transferring the image of fused ink to a recording sheet superimposed on the ink sheet while the sheets are fed along across the recording head, thereby producing the image dependent on the signals on the recording sheet, said recording apparatus comprising:

(a) a first unit having a passage of travel of the recording sheet;
(b) a second unit having a passage of travel of the ink sheet, one of said first and second units having the recording head and the other unit having a platen roller;
(c) a locking mechanism for actuating said first and second units into and out of engagement with each other;
(d) a positioning mechanism for positioning said recording head and said platen roller with respect to each other when the image is recorded on the recording sheet with the first and second units engaging with each other, said recording head and said platen roller jointly defining a recording zone;
(e) a tensioning roller for tensioning at least one of said ink and recording sheets between said tensioning roller and said platen roller upstream of said recording zone;
(f) means for rotating said tensioning roller at a peripheral speed smaller than the peripheral speed of said platen roller, said peripheral speeds of said tensioning roller and said platen roller having a constant ratio;
(g) a drive source for rotating said platen roller; and (h) a frictional power transmission mechanism for transmitting rotation of said platen roller to said tensioning roller.

6. A thermal-image-transfer recording apparatus according to claim 5, wherein said means comprises a first gear fixedly mounted on a shaft of said platen roller, and a second gear loosely mounted on a shaft of said tensioning roller and held in mesh with said first roller, said frictional power transmission mechanism comprising a brake drum fixedly mounted on said shaft of said tensioning roller, and a braking member fixed to said second gear for coacting with said brake drum.

7. A thermal-image-transfer recording apparatus according to claim 5, wherein said recording head comprises a thermal head.

8. A thermal-image-transfer recording apparatus having a recording head responsive to information-dependent signals applied thereto for fusing with heat a thermally fusible ink layer on a base of an ink sheet in the selected pattern of an image and transferring the image of fused ink to a recording sheet superimposed on the ink sheet while the sheets are fed along across the recording head, thereby producing the image dependent on the signals on the recording sheet, said recording apparatus comprising:

(a) a first unit having a passage of travel of the recording sheet;

(b) a second unit having a passage of travel of the ink sheet, one of said first and second units having the recording head and the other unit having a platen roller;

(c) a locking mechanism for actuating said first and second units into and out of engagement with each other; and (d) a positioning mechanism for positioning said recording head and said platen roller with respect to each other when the image is recorded on the recording sheet with the first and second units engaging with each other, said recording head and said platen roller jointly defining a recording zone;

(f) a takeup roller disposed downstream of said recording head for winding up the ink sheet;

(g) a tensioning roller for tensioning the ink sheet between said recording zone and said takeup roller;

(h) a drive source rotatable in one direction only for driving said tensioning roller and said takeup roller;

(i) a frictional power transmission mechanism disposed between said drive source and said tensioning roller for frictionally transmitting drive power from said drive source to said tensioning roller;

(j) a cutter for cutting off the recording sheet bearing the image; and (k) said platen roller being rotatable for feeding said ink and recording sheets through said recording zone and for winding back the recording sheet after the image has been recorded thereon and the recording sheet has been cut off until a leading edge thereof is displaced from said cutter back to said recording zone.

9. A thermal-image-transfer recording apparatus according to claim 8, wherein said recording head comprises a thermal head.

10. A thermal-image-transfer recording apparatus having a platen roller and a recording head responsive to information-dependent signals applied thereto for fusing with heat a thermally fusible ink layer on a base of an ink sheet in the selected pattern of an image and transferring the image of fused ink to a recording sheet superimposed on the ink sheet while the sheets are sandwiched between the platen roller and the recording head and fed along across the recording head, thereby producing the image dependent on the signals on the recording sheet, said recording apparatus comprising:

(a) a first unit including said platen roller and having a passage of travel of the recording sheet;

(b) a second unit including said recording head and having a passage of travel of the ink sheet, said platen roller and said recording head jointly defining a recording zone;

(c) a locking mechanism for actuating said first and second units into and out of engagement with each other;

(d) a positioning mechanism for positioning said recording head and said platen roller with respect to each other when said first and second units engage each other;

(e) a tensioning roller disposed adjacent to said recording zone for coacting with said platen roller in tensioning the ink sheet upstream of said recording zone, said tensioning roller being positionable in the vicinity of or in contact with said platen roller with said sheets interposed therebetween when the image is recorded on said recording sheet;

(f) a first tensioning mechanism disposed in said first unit for tensioning the recording sheet backward upstream of said recording zone;

(g) a separation mechanism for separating said sheets from each other after the image has been recorded on said recording sheet;

(h) a rotary cutter for cutting off said recording sheet as separated from said ink sheet by said separation mechanism;

(i) a second tensioning mechanism disposed in said second unit for tensioning the ink sheet backward upstream of said recording zone;

(j) a takeup mechanism for winding up the ink sheet as separated from said recording sheet by said separation mechanism; and (k) a separation mechanism for moving said recording head into and out of contact with said platen roller when said first and second units engage each other.

11. A thermal-image-transfer recording apparatus according to claim 10, wherein said first unit is fixed and said second unit is movable with respect to said first unit into and out of engagement with the latter.

12. A thermal-image-transfer recording apparatus according to claim 10, wherein said locking mechanism comprises a rail guide mechanism for moving said second unit therealong, a first lever pivotably mounted on said second unit, a locking member mounted on said second unit in coaxial relation to said first lever, and a pin mounted on said first unit for releasably engaging said locking member, said positioning mechanism comprising a bearing member fixedly mounted on said first unit and having a recess, a shaft loosely fitted in said first unit for fitting engagement with said bearing member when said first and second units engage each other, a support arm supporting said recording head and said shaft, a lever mechanism for swinging said support arm about said shaft, a second lever pivotably mounted on said second unit and having a hole defined in one end thereof, said shaft being loosely fitted in said hole, and a resilient member mounted on said second unit for urging said lever to press said shaft into said recess in said bearing member when said first and second units engage each other, said tensioning roller being mounted on said support arm, said first mechanism comprising a second tensioning roller for cooperating with said platen roller in tensioning said recording sheet upstream of said recording zone, means for rotating said second tensioning roller at a peripheral speed smaller than the peripheral speed of said platen roller, said peripheral speeds of said second tensioning roller and said platen roller having a constant ratio, and a frictional power transmission mechanism for transmitting rotation of said platen roller to said second tensioning roller, said second mechanism comprising a third tensioning roller movable in response to the feeding of the ink sheet, a pinch roller movable into and out of contact with said third tensioning roller, and resilient energy storing means for urging said third tensioning roller to rotate in a reverse direction, said separation mechanism comprising a separation roller around which said ink sheet is trained, and a separator having one end pivotably mounted in a fixed position and an opposite abutment edge pressed due to gravity against the sheet trained around said separation roller, said rotary cutter comprising a fixed cutter blade, an angularly movable cutter blade, means supporting said fixed cutter blade and said angularly movable cutter blade, and a guide member disposed downstream of said cutter blades in a direction of travel of the recording sheet for guiding a leading edge thereof, said takeup mechanism comprising a takeup roller disposed downstream of said recording head for winding up the ink sheet, a fourth tensioning roller for tensioning the ink sheet between said recording zone and said takeup roller, a drive source rotatable in one direction only for driving said fourth tensioning roller and said takeup roller, and a frictional power transmission mechanism disposed bewteen said drive source and said tensioning roller for frictionally transmitting drive power from said drive source to said tensioning roller, said separation mechanism comprising said support arm, resilient means for resiliently urging said support arm to press said recording head resiliently against said platen roller, a cam acting on said support arm for turning said support arm against the resilient force of said resilient means, a lever coaxially mounted on said cam, and a swinging mechanism for swinging said last-mentioned lever, the arrangement being such that movement of said pinch roller into and out of contact with said third tensioning roller in said second mechanism, movement of said pinch roller into and out of contact with said fourth tensioning roller in said takeup mechanism, engagement and disengagement between said first and second units, and positioning of said recording head with respect to said platen roller, can simultaneously be effected by said first lever of said locking mechanism, and said recording sheet is wound back until a leading edge thereof returns from said rotary cutter to said recording zone subsequent to the cutting off of said recording sheet by said rotary cutter after the image has been recorded on said recording sheet.

13. A thermal-image-transfer recording apparatus according to claim 12 wherein said means for rotating said second tensioning roller in said first mechanism comprises a first gear fixedly mounted on a shaft of said platen roller, and a second gear loosely mounted on a shaft of said second tensioning roller and held in mesh with said first roller, said frictional power transmission mechanism in said first mechanism comprising a brake drum fixedly mounted on said shaft of said second tensioning roller, and a braking member fixed to said second gear for coacting with said brake drum.

14. A thermal-image-transfer recording apparatus according to claim 12, wherein said resilient energy storing means in said second mechanism comprises a first gear fixedly mounted on a shaft of said third tensioning roller, a second shaft extending parallel to said shaft of said third tensioning roller, a second gear rotatably fitted over said second shaft, a drum rotatably fitted over said second shaft, a spiral spring disposed in said drum and having one end fixed to said drum and an opposite end fixed to said second gear, and a braking member pressed at a fixed position against an outer circumferential surface of said drum under an adjusted resilient force.

15. A thermal-image-transfer recording apparatus according to claim 10, wherein said recording head comprises a thermal head.

* * * * *